United States Patent

Tatsumi et al.

[11] Patent Number: 5,307,631
[45] Date of Patent: May 3, 1994

[54] HYDRAULIC CONTROL APPARATUS FOR HYDRAULIC CONSTRUCTION MACHINE

[75] Inventors: Akira Tatsumi, Kashiwa; Seiji Tamura, Ibaraki; Mitsuo Kihara, Ibaraki; Kazuhiro Ichimura, Ibaraki; Hiroshi Onoue, Ibaraki; Shigetaka Nakamura, Tsuchiura, all of Japan

[73] Assignee: Hitachi Construction Machinery Co., Ltd., Tokyo, Japan

[21] Appl. No.: 927,408

[22] PCT Filed: Jan. 28, 1992

[86] PCT No.: PCT/JP92/00075
§ 371 Date: Oct. 29, 1992
§ 102(e) Date: Oct. 29, 1992

[87] PCT Pub. No.: WO92/13144
PCT Pub. Date: Aug. 6, 1992

[30] Foreign Application Priority Data

Jan. 28, 1991 [JP] Japan .................. 3-26912
Jul. 24, 1991 [JP] Japan .................. 3-184802

[51] Int. Cl.⁵ .............................. F16D 31/02
[52] U.S. Cl. ......................... 60/452; 91/517; 91/459
[58] Field of Search ............... 60/420, 423, 426, 427, 60/431, 445, 449, 450, 452; 91/514, 517, 518, 459

[56] References Cited

U.S. PATENT DOCUMENTS

| 4,655,689 | 4/1987 | Westveer et al. | 60/449 X |
| 4,672,811 | 6/1987 | Yoshida et al. | 60/445 X |
| 4,704,866 | 11/1987 | Myers | 60/449 |
| 4,759,183 | 7/1988 | Kreth et al. | 60/445 X |
| 4,967,557 | 11/1990 | Izumi et al. | 60/452 X |
| 5,074,194 | 12/1991 | Hirata et al. | 91/459 X |
| 5,182,908 | 2/1993 | Devier et al. | 91/518 X |

FOREIGN PATENT DOCUMENTS 2-118203 5/1950 Japan .
3-234364 10/1991 Japan .

Primary Examiner—Edward K. Look
Assistant Examiner—Hoang Nguyen
Attorney, Agent, or Firm—Oliff & Berridge

[57] ABSTRACT

The displacement of a variable displacement hydraulic pump (1) which is driven by a diesel engine (27) is so controlled as to be set to a first target displacement to keep a pump pressure higher than a load pressure by a predetermined target value, or a second target displacement to limit an input torque on the basis of the pump pressure. Provided is a stand-by flow rate control portion (65) which outputs a third target displacement larger than the minimum value of said first target displacement. The displacement of the pump (1) is controlled so as to be set to the third target displacement when the third target displacement is output from the stand-by flow rate control portion (65).

25 Claims, 11 Drawing Sheets

HYDRAULIC CONTROL APPARATUS FOR HYDRAULIC CONSTRUCTION MACHINE

TECHNICAL FIELD

This invention relates to a hydraulic control apparatus for a hydraulic construction machine for which a load sensing control and an input torque limiting control can be performed.

BACKGROUND ART

A wheel type hydraulic shovel, for example, as shown in FIG. 10 has been known as a hydraulic construction machine equipped with the above type of hydraulic control apparatus. In the figure, a reference numeral 4 represents a hydraulic motor for vehicle travelling, and rear wheels 103 are driven through a transmission 101 and a propeller shaft 102 by the rotation of the hydraulic motor 4 to allow a vehicle to travel. A boom 104 serving as a part of a front attachment is upwardly and downwardly moved through a lengthening and shortening operation of a boom cylinder 21. In this specification, a digging work and the like using the front attachment while the vehicle does not travel is referred to merely as "work", and these works are distinguished from a term "travel".

As one of the hydraulic construction machines as described above has been proposed a machine in which a load sensing control and an input torque limiting control are selectively carried out (for example, as disclosed in Japanese Laid-open Patent Application No. 2-118203). These control systems will be described hereunder with reference to FIG. 11.

FIG. 11 shows a hydraulic circuit for the travel and the work of the hydraulic shovel as described above, and a reference numeral 1 represents a variable displacement hydraulic pump which is driven by a diesel engine 27. The rotational speed of the engine 27 is controlled through rotational member of a governor lever 27b of a governor 27a which is driven, in accordance with an manipulation amount of a fuel lever (not shown) or an operation amount of an acceleration pedal 6a for the travel (hereinafter referred to as a travelling pedal), by a pulse motor 28. A variable displacement hydraulic pump 1 discharges an oil whose flow amount corresponds to the engine rotational speed and the displacement thereof. The discharged oil is communicated through a travel-control valve 2 to the hydraulic motor 4, and further communicated through a work-control valve 20 to a boom-driving hydraulic cylinder 21.

The load sensing control is characterized in that the displacement (hereinafter also referred to as "tilt angle") of the variable displacement hydraulic pump 1 is so controlled that the difference pressure between front and rear stages of the travel-control valve 2 or the work-control valve 20, that is, the difference pressure between a pressure (pump pressure) at an inlet port of the control valve 2, 20 and a pressure (load sensing pressure) at an outlet port thereof is fixed to a constant value to thereby keeping the pump pressure to a value higher than the load sensing pressure by a predetermined target value. The load sensing pressure is a pressure selected by a shuttle valve 29 and higher one of load pressures of the hydraulic motor 4 and the hydraulic cylinder 21.

The system for carrying out the load sensing control as shown in FIG. 11 is equipped with a load sensing regulator 11 whose switching operation is carried out in accordance with the difference pressure between the pump pressure and the load sensing pressure. When the difference pressure between the pump pressure and the load sensing pressure exceeds a pressure which is set by a spring 11a, the load sensing regulator 11 is switched to a position b in accordance with the pressure. At the position b, the pump pressure is communicated to a servo cylinder 12, and the displacement of the hydraulic pump 1 is reduced through a lengthening operation of the servo cylinder 12, so that the delivery flow rate of the pump is reduced. Conversely, when the difference pressure is dropped down to a value lower than the predetermined pressure, the load sensing regulator 11 is switched to a position a, and the servo cylinder 12 is intercommunicated to a tank. Consequently, the displacement as described above is increased, and thus the pump delivery flow rate is also increased. In the system adopting the load sensing control, through the above operation, the tilt angle of the pump is so controlled that the pump delivery flow rate is equal to a required flow rate of the control valve 2 or 20, so that a surplus flow rate of oil can be prevented from being delivered and vain use of the oil due to diaphragm loss can be prevented to improve fuel consumption and operational performance.

Next, the operation of the travelling circuit will be described.

When a forward/reverse travelling switch valve 8 is switched to a forward travelling position (F position) and the pedal 6a of a pilot valve 6 is manipulated, a delivery oil from the hydraulic pump 5 is communicated to a pilot port 2a of a pilot type control valve 2, so that the control valve 2 carries out its switching operation by a stroke amount corresponding to a pilot oil pressure. Through this operation, the delivery oil from the variable displacement hydraulic pump 1 is supplied through a conduit 91, a pressure compensating valve 23, the control valve 2, a conduit 92 and a counterbalance valve 3 to the hydraulic motor 4 to allow the vehicle to run. In addition, the engine rotational speed is controlled in accordance with the operation amount by which the travelling pedal 6a is depressed, so that the travelling speed of the vehicle is dependent on the operation amount of the travelling pedal 6a.

When the travelling pedal is released in the travelling of the vehicle, the connection between the output port and input port of the pilot valve 6 is intercepted, and the output port of the pilot valve 6 is intercommunicated with a tank port which is connected to the tank 10. As a result, the pressured oil which acts on the pilot port 2a is returned through the forward/reverse travelling switch valve 8, a slow return valve 7 and the pilot valve 6 to the tank 10. At this time, the return oil is diaphragmed by a diaphragm 7a of the slow return valve 7, so that the vehicle is gradually decelerated while the pilot-type control valve 2 is gradually switched to a center valve position.

On the other hand, the operation of the working circuit is as follows.

When the work switching valve 20 is switched to a "b" position or "c" position by a manipulating lever 20a, the delivery oil from the hydraulic pump 1 is communicated through the conduit 91, the pressure compensating valve 24, a conduit 94 and the control valve 20 to the boom-driving hydraulic cylinder 21, and the boom 104 as shown in FIG. 10 is upwardly and downwardly moved through the lengthening and shortening operation of the hydraulic cylinder 21. The pressure compensating valves 23 and 24 enable the hydraulic pump 1 to supply the hydraulic motor 4 and the hydraulic cylinder 21 with pressures higher than the load pressures thereof by a predetermined pressure, respectively, so that both actuators can be operated independently of each other.

The hydraulic control apparatus as shown in FIG. 11 is equipped with a torque control servo valve 25 for carrying out the input torque limiting control, and the servo valve 25 is supplied with the delivery pressure of the hydraulic pump 1 as a pilot pressure. When the pilot pressure acting on the servo valve 25 exceeds a pressure set by a limit torque setting spring 25a, the servo valve 25 is switched from the c-position to the d-position as shown in the figure. Through this operation, the delivery pressure of the hydraulic pump 1 acts on the servo cylinder 12, whereby the displacement of the hydraulic pump 1 is reduced, and the torque of the hydraulic pump 1 is kept in a range of the output torque of the engine 27, thereby preventing an overload from being applied to the engine 27. This operation is referred to as the input torque limiting control.

According to the hydraulic control apparatus thus constructed, the displacement of the hydraulic pump is so controlled that it is equal to smaller one of the target displacement by the load sensing control (first target displacement) and the target displacement by the input torque limiting control (second target displacement), and through this operation the improvement in fuel consumption and operating performance and the prevention of overload acting on the engine 27 are accomplished. A reference numeral 26 represents an unload valve which is driven by the difference pressure between the pump pressure and the load sensing pressure, reference numerals 31a and 31b represent a cross-over load relief valve, and CJ represents a center joint.

The hydraulic control apparatus equipped with the load sensing control and the input torque limiting control systems is so constructed that the maximum value of the displacement of the variable displacement hydraulic pump 1 is limited by a value which is determined by the servo valve 25 at the input torque limiting control system side, and in a range below this maximum value the displacement of the variable displacement hydraulic pump 1 is set to the displacement which is determined by the load sensing regulator 11 at the load sensing control system side. As a result of this, the displacement of the variable hydraulic pump 1 is so controlled as to be uniformly set to any one of the input torque limiting control value and the load sensing control value on the basis of the operation amount of the travelling pedal, the operation amount of the manipulating lever or the circuit pressure condition irrespective of variation of an operating circumstance such as "travel" or "work", or an operator's preference.

Therefore, the following two problems occur.

(1)

At a neutral state where the manipulating lever 20a and the travelling pedal 6a are not operated, the load sensing regulator 11 and the servo valve 25 are switched to the b-position and the c-position respectively to limit the displacement of the variable displacement hydraulic pump 1 to the minimum value, and thus the pump delivery flow rate is small. Therefore, when the manipulating lever is rapidly operated from the neutral position, although the displacement of the pump is intended to be increased in accordance with the operation amount of the manipulating lever, it takes a long time until the displacement reach a displacement corresponding to the manipulating lever position. Therefore, there occurs a problem that responsibility of the actuator is low. In this specification, a pump delivery flow rate when the control valves 2 and 20 are in their neutral position is referred to as "stand-by delivery flow rate".

(2)

The applicant of this application has proposed a device in which the engine rotational speed can be controlled in accordance with the manipulation of the travelling pedal 6a in the work, as disclosed in Japanese Laid-open Patent Application No. 3-234364. The following problem would occur if this device is used together with the hydraulic control apparatus as shown in FIG. 11 in which the displacement is controlled by selecting any one of the displacement determined by the load sensing control and the displacement determined by the input torque limiting control.

In the load sensing control where the difference pressure at the front and rear stages of the control valve 2 or 20 is fixed to a constant value, in a case where the opening area of the control valve 2, that is, the stroke of the manipulating lever is constant, the displacement of the hydraulic pump 1 is automatically decreased so as to prevent the rise up of the difference pressure as described above even when the rotational speed of the engine 27 is heightened and thus the pump delivery flow rate is increased while it is increased so as to prevent the drop of the difference pressure even when the rotational speed of the engine 27 is lowered and thus the pump delivery flow rate is decreased. Therefore, in the work when the load sensing control is carried out with the control of the engine rotational speed using the travelling pedal 6a by which no adjustment of the opening area of the control valve 2 is carried out, the pump delivery flow rate remains constant even when the engine rotational speed is varied, and the driving speed of the front attachment (for example, boom) is not varied, whereby an efficiency during the work is low. The speed of the front actuator can be controlled through the control of the engine rotational speed in a state where a difference pressure which is beforehand set does not occur even when the tilt angle of the hydraulic pump 1 is increased to the maximum value, or in a case where a target flow rate exceeds a torque limiting flow rate (in a saturation state).

DISCLOSURE OF THE INVENTION

An object of this invention is to provide a hydraulic control apparatus for a hydraulic construction machine in which a target value of a displacement of a pump based on a load sensing control and a target value of the displacement of the pump based on an input torque limiting control are not uniformly selected, particularly the target value of the displacement of the pump based on the load sensing control being limited, and the selected target value differs between cases where the limitation is imposed and where no limitation is imposed even for the same operating circumstance.

Regarding an Independent Claim and Dependent Claims of Claim 1

(1) This invention is applicable to a hydraulic construction machine including a variable displacement hydraulic pump which is driven by a prime mover, a first hydraulic actuator which is driven by delivery oil from the hydraulic pump, a first control valve which is provided between the hydraulic pump and the first hydraulic actuator and serves to control pressured oil to be supplied to the first hydraulic actuator, first determination means for determining a first target displacement to keep a delivery pressure of the hydraulic pump to a value higher than a load pressure of the first hydraulic actuator by a predetermined target value, second determination means for determining a second target displacement to limit an input torque on the basis of the delivery pressure of the hydraulic pump, and displacement control means for controlling displacement of the hydraulic pump such that the displacement is equal to at least one of the first and second target displacements.

The above-noted object is achieved by providing control means for imposing limitation on a signal representing the first target displacement which is determined and output by the first determination means.

The displacement of the variable displacement hydraulic pump is controlled to be equal to at least one of the first target displacement determined by the first determination means and the second target displacement determined by the second determination means. Through a mode of the control means, the displacement of the variable displacement hydraulic pump is controlled to be equal to a value obtained by imposing the limitation on the first target displacement, or it is controlled to be equal to the second target displacement at all times with no action of the first target displacement.

(2) The control means preferably includes limit-signal output means for outputting a limit signal indicating a value larger than the minimum value of the first target displacement which is output from the first determination means, maximum-value selecting means for comparing the value indicated by the limit signal and the first target displacement output from the first determination means to select and output a larger one of these values, and limiting-operation instructing signal output means for outputting a limiting-operation instructing signal which causes the limit-signal output means to be operated through an operator's manipulation, wherein the displacement is controlled so as to be equal to smaller one of the target displacement selected by the maximum-value selecting means and the second displacement target.

For example, when the first control valve is in a neutral position and the hydraulic actuator is stopped, the first target displacement is the minimum value and the second target displacement is substantially the maximum value. In this circumstance, if the limiting-operation instructing signal is outputting through the operator's manipulation, the target displacement which is indicated by the limit signal is selected by the maximum-value selecting means and the minimum-value selecting means, and the displacement of the variable displacement hydraulic pump is set to a value larger than the first target displacement but smaller than the second target displacement. Therefore, the delivery flow rate (hereinafter referred to as "stand-by flow rate") of the hydraulic pump when the first control valve is in the neutral position can be increased, and a time required for the delivery flow rate to reach a required delivery flow rate when the first control valve is rapidly manipulated can be shortened.

(3) The limiting-operation instructing signal output means preferably comprises a switch which is manipulated by the operator, and the operation as described above can be achieved by imposing the limitation on the first target displacement when the operator manipulates the switch in his intention.

(4) At least two kinds of limiting-operation instructing signals may be output from the limiting-operation instructing signal output means, and a target displacement whose value corresponds to each of the two kinds of input limiting-operation instructing signal may be output from the limit-signal output means. The stand-by flow rate may be altered in accordance with a circumstance of the work.

(5) The limiting-operation instructing signal output means may be so designed as to include an operating member for outputting at least two kinds of limiting-operation instructing signals in accordance with the manipulation amount of the operating member by the operator.

(6) The control means may include minimum-value selecting means for selecting smaller one of the first target displacement output from the first determination means and the second target displacement output from the second determination means, selection means for selecting any one of the target displacement selected by the minimum-value selecting means and the second target displacement, and selection instructing signal output means for outputting a selection instructing signal for instructing the selection of the output of the minimum-value selecting means or the second target displacement as the target displacement to be selected in the selection means.

According to the hydraulic control apparatus thus modified, usually the displacement is controlled to be equal to the minimum value of the first and second target displacements, and when the selection instructing signal is output, the displacement is controlled to be equal to the second target displacement irrespective of the first target displacement. Therefore, an operational feeling can be improved by outputting a selection instructing signal in an operating circumstance where the control of the displacement using the input torque limiting value is more preferable than the control of the displacement using the load sensing control value.

(7) The limiting-operation instructing signal may be output upon the manipulation of the operating member such as the manipulating lever or the travelling pedal.

(8) The hydraulic construction machine may further include first operating means which is manipulated to fix the rotational speed of the prime mover to an arbitrary rotational speed, second operating means which is manipulated to control the rotational speed of the prime mover and returned to an initial low rotational speed when the manipulating force is released, rotational speed control means for controlling the rotational speed of the prime mover in accordance with the first and second operating means, a second hydraulic actuator which is driven by the delivery oil from the hydraulic pump, and a second control valve which is provided between the hydraulic pump and the second hydraulic actuator and serves to controlling the pressured oil which is supplied to the second hydraulic actuator. In this case, as the limiting-operation instructing signal output means, preferably used is judging means for outputting a selection instructing signal indicating the selection of the second target displacement on the basis of the discrimination of a state where the first hydraulic actuator is operated while the rotational speed of the prime mover is controlled by the second operating means.

(9) The first determination means may comprise a well-known load sensing control system for detecting a difference pressure between the pressure of a conduit for intercommunicating the first control valve with the hydraulic pump and the pressure of a conduit for intercommunicating the first control valve with the first hydraulic actuator to calculate a deviation between a predetermined target difference pressure and the detected difference pressure, and calculating the first target displacement on the basis of the deviation thus calculated.

(10) The second determination means may comprise a well-known input torque limiting control system for detecting a deviation between an actual rotational speed of a diesel engine serving as the prime mover and a control rotational speed indicated by the position of the governor lever of the diesel engine, calculating on the basis of the detected deviation a target torque with which the diesel engine suffers from no engine stall, and detecting the delivery pressure of the variable displacement hydraulic pump to calculate the second target displacement on the basis of the reciprocal of the detected delivery pressure and the target torque.

Independent Claim and Dependent Claims of Claim 11

(11) This invention is also applicable to a hydraulic control apparatus for a hydraulic construction machine including first operating means which is manipulated to fix the rotational speed of the prime mover to an arbitrary rotational speed, second operating means which is manipulated to control the rotational speed of the prime mover and is returned to an initial low rotational speed when the manipulating force is released, rotational speed control means for controlling the rotational speed of the prime mover in accordance with the first and second operating means, a variable displacement hydraulic pump which is driven by the prime mover, a first hydraulic actuator which is driven by a delivery oil from the hydraulic pump, a second hydraulic actuator which is driven by the delivery oil of the hydraulic pump, a first control valve which is provided between the hydraulic pump and the first hydraulic actuator and serves to control a pressured oil supplied to the first hydraulic actuator, a second control valve which is provided between the hydraulic pump and the second hydraulic actuator and serves to control a pressured oil supplied to the second hydraulic actuator, first determination means for determining a first target displacement to keep the delivery pressure of the hydraulic pump to a value higher than load pressure of the first and second hydraulic actuators by a predetermined target value, second determination means for determining a second target displacement to limit an input torque on the basis of the delivery pressure of the hydraulic pump, displacement control means for controlling the displacement of the hydraulic pump so that the displacement is equal to at least one of the first and second target displacements.

In addition, the hydraulic control apparatus further comprises judging means for outputting a discrimination signal on the basis of the discrimination of a state where the first hydraulic actuator is operated while the rotational speed of the prime mover is controlled by the second operating means. The above object ca be achieved by constructing the hydraulic control apparatus such that when the discrimination signal is output, the displacement of the variable displacement hydraulic pump is so controlled that it is equal to the second target displacement irrespective of the value of the first target displacement.

When it is discriminated that the first hydraulic actuator is operated with the rotational speed of the prime mover being controlled by the second operating means, the displacement of the variable displacement hydraulic pump is so controlled as to be equal to the second target displacement. In the hydraulic control apparatus for carrying out the load sensing control and the input torque limiting control in accordance with an operating condition, for example when the rotational speed of the prime mover is controlled in accordance with an operation amount of the travelling pedal during the work other than the vehicle travelling, the displacement of the variable displacement pump is forcedly controlled through the input torque limiting control. Therefore, the operational speed of the front attachment such as a boom can be controlled in response to the pedal manipulation through the control of the rotational speed of the prime mover by manipulating the travelling pedal in the work, and thus the operation performance can be improved.

(12) The hydraulic control apparatus preferably further comprises minimum-value selecting means for selecting smaller one of the first and second target displacements, and switching means for outputting the target displacement selected by the minimum-value selecting means when the discrimination signal is not output, and outputting the second target displacement when the discrimination signal is output.

(13) The hydraulic control apparatus may comprises limit signal output means for outputting a limit signal indicating a value lager than the minimum value of the first target displacement, maximum-value selecting means for comparing the value of the limit signal and the first target displacement to select a larger one of them, and outputting the selected value, minimum value selecting means for selecting smaller one of the target displacement output from the maximum-value selecting means and the second target displacement, and limiting-operation instructing signal outputting means for outputting the limiting-operation instructing signal for actuating the limit-signal output means through the operator's manipulation.

(14) The first hydraulic actuator may comprise a hydraulic cylinder for a front attachment, the second hydraulic actuator may comprise a hydraulic motor for a vehicle travelling, the first operating means may comprise a manual manipulation member, and the second operating means may comprise a pedal-type manipulation member.

(15) The manual manipulation member is most preferably used a fuel lever for setting the rotational speed of the prime mover in accordance with the manipulation position thereof, and the pedal-type manipulation member is most preferably used a travelling pedal with which the opening area of the second control valve can be adjusted in accordance with the operation amount thereof.

According to this invention, when the rotational speed of the prime mover is controlled by manipulating the fuel lever, any one of the load sensing control and the input torque limiting control is carried out in accordance with an operating condition. On the other hand, when the rotational speed of the prime mover is controlled by manipulating the travelling pedal at the work, the input torque limiting control is forcedly carried out. Therefore, if the rotational speed of the prime mover is controlled through the manipulation of the travelling pedal at the work, the pump flow rate varies in accordance with the manipulation of the travelling pedal, and the front attachment such as the boom can be controlled at a desired speed.

(16) If the hydraulic control apparatus further comprises inhibition means for inhibiting the driving of the second hydraulic actuator when the discrimination signal is output, there is no risk that the wheel-type hydraulic shovel or the like unintentionally moves at the work, so that more preferable advantage can be attained.

(17) The rotational speed control means may include first target rotational speed setting means for setting a first target rotational speed of the prime mover in accordance with the manipulation amount of the first operating means, second target rotational speed setting means for setting a second target rotational speed of the prime mover in accordance with the manipulation amount of the second operating means, selection means for selecting a larger one of the first and second target rotational speeds of the prime mover, and rotational speed increasing/decreasing means for increasing or decreasing the rotational speed of the prime mover so that it is equal to the selected target rotational speed.

BEST MODE FOR CARRYING OUT THE INVENTION

First Embodiment

A first embodiment of this invention will be described with reference to FIGS. 1 to FIG. 3.

The hydraulic control apparatus according to the first embodiment is constructed such that the displacement is usually controlled to be set to smaller one of a first target displacement calculated in a load sensing control system and a second target displacement calculated in an input torque limiting control system, and when higher responsibility is required a limitation is imposed on the first target displacement to increase a stand-by flow rate, and then the displacement is controlled to be set to smaller one of a limit value larger than the first target displacement and the second target displacement.

Figure 2:
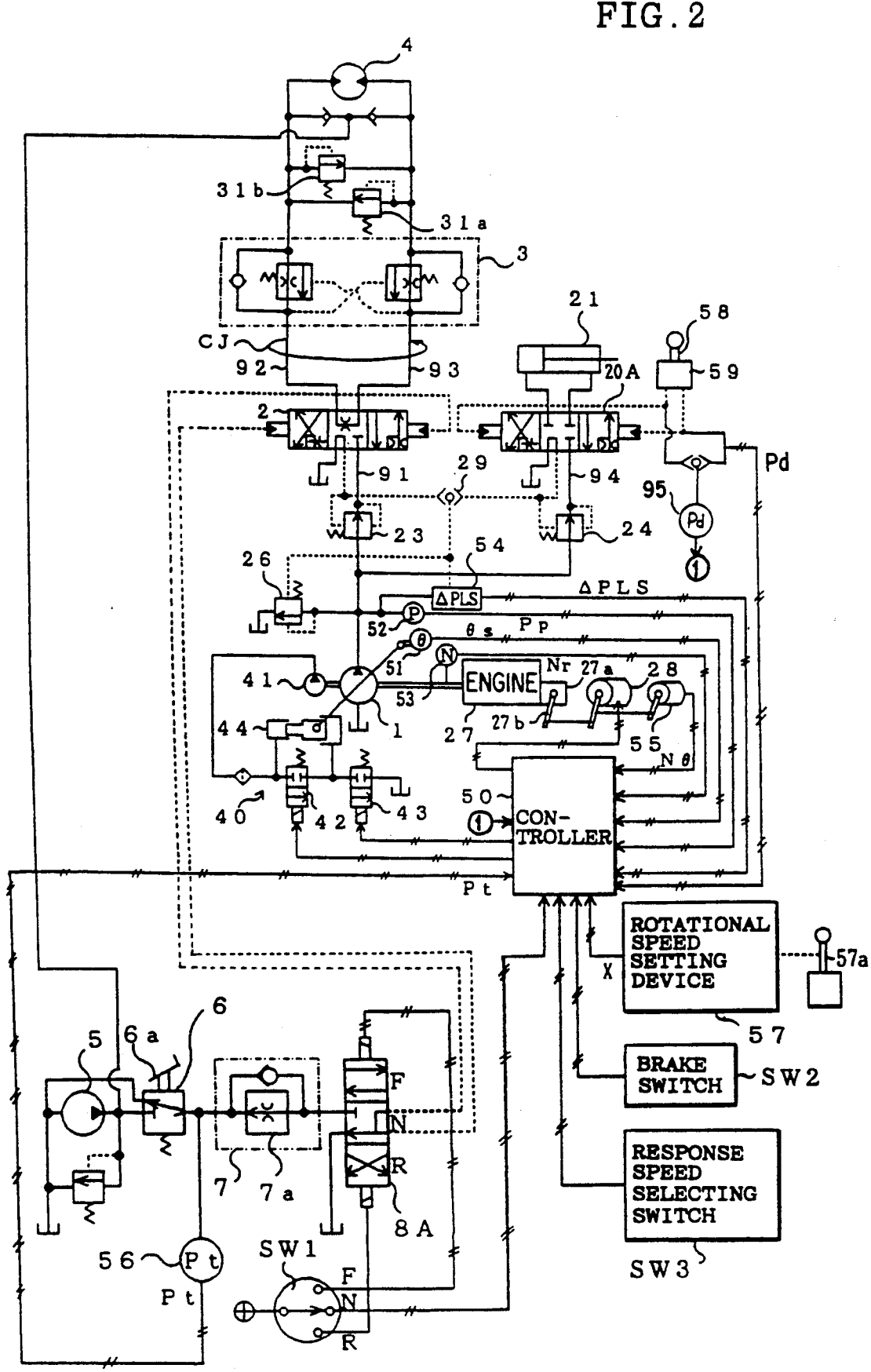
FIG. 2 is a diagram showing the whole construction of the hydraulic control apparatus.
Figure 3:
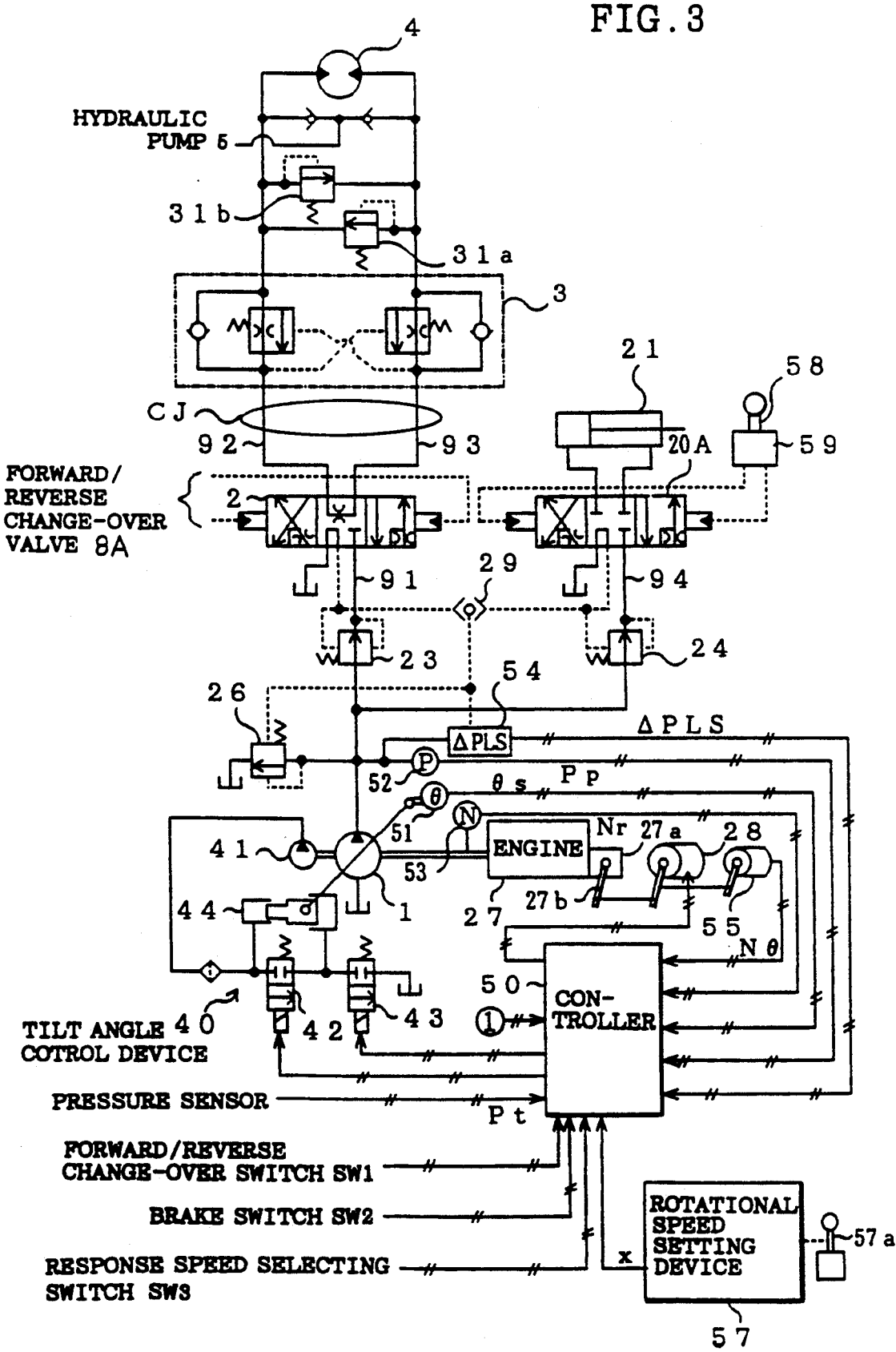
FIG. 3 is an enlarged view of a part of FIG. 2.
Figure 11:
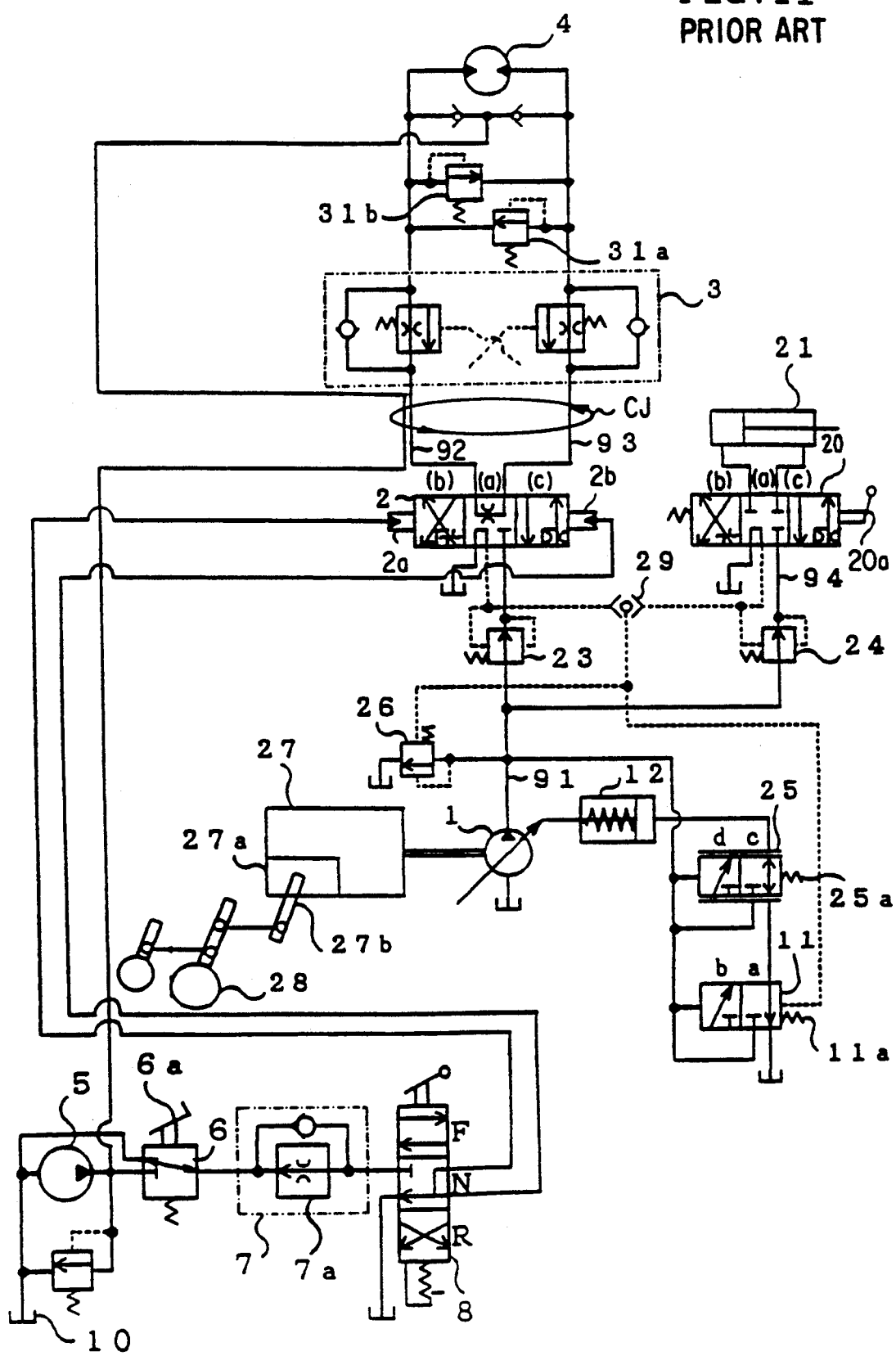
FIG. 11 is a diagram showing a conventional hydraulic control apparatus.

FIG. 2 is a diagram showing the whole construction of a hydraulic control apparatus for a wheel-type hydraulic shovel to which this invention is applied, and FIG. 3 is an enlarged diagram of a part of the control apparatus. The same elements as those of FIG. 11 are represented by the same reference numerals, and the difference therebetween will be mainly described.

In this embodiment, a tilt angle of a variable displacement hydraulic pump 1, that is, the displacement thereof is controlled by a tilt angle control device 40. The tilt angle control device 40 comprises a hydraulic pump 41 which is driven by an engine 27, a pair of electromagnetic valves 42 and 43, and a servo cylinder 44 whose piston position is controlled by a pressured oil from the hydraulic pump 41 in accordance with a switching operation of the electromagnetic valves 42 and 43. The tilt angle of the hydraulic pump 1 is controlled in accordance with the piston position of the servo cylinder 44. The switching operation of the pair of the electromagnetic valves 42 and 43 is controlled by a controller 50 mainly comprising a microcomputer.

A forward/reverse travel switching valve 8A comprises an electromagnetic type of valve, and it is switched from an N-position to an F-position or R-position when a forward/reverse travel switching switch SW1 at a driver sheet is switched from an N-position to an F-position or R-position. A control valve 20A for a work comprises a pilot-type valve, and a switching direction and a stroke amount are controlled by pilot pressure output from a pressure reducing valve in accordance with the operation amount of a manipulation lever 58.

SW2 represents a brake switch, and it is switched on by operator's manipulation at the work while it is switched off at a vehicle travelling. SW3 represents a response speed selecting switch, and it is switched on when a quick mode is set to increase the stand-by flow rate as described later while it is switched off when a normal mode is set to seriously consider fuel consumption and noise. The output signals of these switches SW2 and SW3 are commonly input to the controller 50.

Unlike the prior art as shown in FIG. 11, in this embodiment, an operating condition of the vehicle such as the work or the travel is electrically detected, and the displacement of the hydraulic pump is electrically controlled. In this connection, the displacement of the hydraulic pump is controlled by inputting the signals of the switches as described above and a group of sensors as described later to the controller 50 and executing various calculations in the controller 50 to drive various kinds of actuators.

A reference numeral 51 represents a tilt angle sensor for detecting a tilt angle $\theta s$ of the hydraulic pump 1, a reference numeral 52 represents a pressure sensor for detecting a delivery pressure Pp of the hydraulic pump 1, a reference numeral 53 represents a rotational speed sensor for detecting a rotational speed Nr of the engine 27, and a reference numeral 54 represents a difference-pressure sensor for detecting a difference pressure $\Delta PLS$ between the delivery pressure of the hydraulic pump 1 and the maximum load pressure of the actuator (which is larger one of a load pressure of the hydraulic motor 4 and a load pressure of the hydraulic cylinder 21 and selected by the shuttle valve 29). A reference numeral 55 represents a potentiometer for detecting a control rotational speed $N\theta$ on the basis of a displacement amount of the governor lever 27b, a reference numeral 56 represents a pressure sensor for detecting a pressure Pt of the pilot valve 6 in accordance with the manipulation amount of the travelling pedal 6a, and a reference numeral 95 represents a pressure switch which is switched on when a working pilot pressure Pd is above a predetermined value. The detection result of each sensor and the on/off state of the pressure switch 95 are input to the controller 50. A reference numeral 57 represents a rotational speed setting device for instructing a target rotational speed X in accordance with the manual operation of the fuel lever 57a, and the instructing signal thereof is also input to the controller 50.

Figure 1:
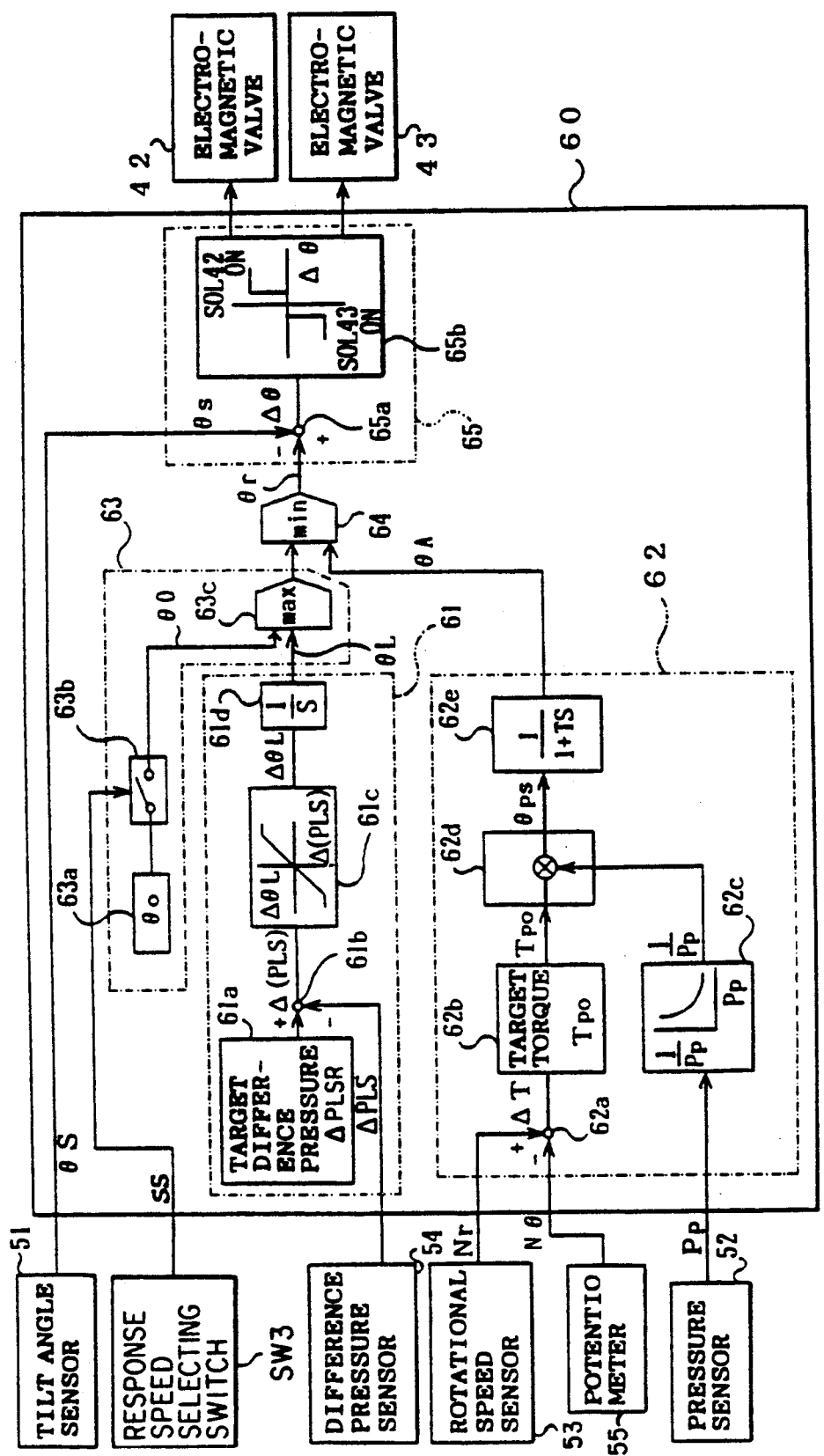
FIG. 1 is a block diagram showing a pump control system for a hydraulic control apparatus according to a first embodiment of this invention.

The controller 50 has a first control circuit unit 60 as shown in FIG. 1 which comprises a load sensing control portion 61 (hereinafter referred to as "LS control portion") for calculating and outputting a first target displacement $\theta L$, a torque control portion 62 for calculating and outputting a second target displacement $\theta A$, a stand-by flow rate control portion 63 for outputting a third target displacement $\theta O$ in place of the first target displacement $\theta L$ to increase the stand-by flow rate, a minimum-value selecting portion 64 for selecting smaller one of the first or third target displacement input through the minimum-value selecting portion 64 and the second target displacement input through the torque control portion 62, and a servo control portion 65 for controlling the electromagnetic valves 42 and 43 for displacement-controlling on the basis of the target displacement input from the minimum-value selecting portion 64 and the actual displacement.

The LS control portion 61 comprises a target difference pressure generator 61a for outputting a signal corresponding to a target difference pressure $\Delta PLSR$, a deviator for calculating a deviation $\Delta$ (PLS) between the target difference pressure $\Delta PLSR$ and the difference pressure $\Delta PLS$ detected by the difference pressure sensor 54, a calculator 61c for calculating a variation $\Delta \theta L$ of the target value based on the deviation $\Delta$ (PLS), and a integrator 61d for integrating $\Delta \theta L$ to calculate the first target displacement $\theta L$ for the load sensing control and outputting the calculated value.

The torque control portion 62 comprises a deviator 62a for calculating a surplus torque $\Delta T$ on the basis of a deviation between the engine rotational speed Nr which is detected by the rotational speed sensor 53 and the control rotational speed $N\theta$ represented by the displacement amount of the governor lever which is detected by the potentiometer 55, a target torque calculator 62b for calculating a target torque Tpo for preventing the engine stall on the basis of the surplus torque $\Delta T$, a reciprocal calculator 62c for calculating a reciprocal of the pump delivery pressure Pp detected by the pressure sensor 52, a $\theta ps$ calculator 62d for calculating a tilt angle $\theta ps$ by multiplying the target torque Tpo by the reciprocal 1/Pp, and a filter 62e for subjecting the tilt angle $\theta ps$ to a filtering serving as a temporarily-delayed element to output a second target displacement $\theta A$ for the input torque limiting control.

The stand-by flow rate control portion 63 comprises a stand-by flow rate setting unit 63a for outputting a value corresponding to a third target displacement $\theta O$ which is at least larger than the minimum value of the first target displacement $\theta L$ calculated in the LS control portion 61, a switch 63b which is closed to output the third target displacement $\theta O$ when the response speed selecting switch SW3 is switched on, and a maximum-value selecting portion 63c for selecting and outputting larger one of the first target displacement $\theta L$ and the third target displacement $\theta O$.

The maximum value selecting portion 63c inputs larger one of the first target displacement $\theta L$ and the third target displacement $\theta O$ to the minimum-value selecting portion 64. The minimum-value selecting portion 64 selects smaller one of the first or third target displacement $\theta L$ or $\theta O$ and the second target displacement $\theta A$ to input the selected value to he servo control portion 65 as a tilt angle instructing value $\theta r$.

The servo control portion 65 includes a deviator 65a for calculating a deviation between the selected tilt angle instructing value $\theta r$ and a tilt angle feedback value $\theta s$ detected by the tilt angle sensor 51, and a function generator 65b for outputting an on signal to the electromagnetic value 42 or 43 when $\theta s$ is larger than a value of insensitivity range, and controls the tilt angle control device 40 so that the pump tilt angle $\theta s$ is coincident with the tile angle instructing value $\theta r$.

The operation of the first embodiment thus constructed will be next described.

The following process is carried out in the first control circuit portion 60 of the controller 50 as shown in FIG. 1.

(1) In a state where the manipulating lever 58 and the travelling pedal 6a are in a non-operation state and each of the control valves 2 and 20A is in its neutral position, when the response speed selecting switch SW3 is in an off-state and the normal mode is selected, a selection signal SS output from the switch SW3 is in a low-level state and the switch 63b is opened. Therefore, the maximum-value selecting portion 63c selects the LS control value $\theta L$ from the LS control portion 61 and outputs it. When each of the control valves 2 and 20A is in its neutral position, the first target displacement $\theta L$ calculated in the LS control portion 61 becomes a value $\theta Lmin$ which is minimum for the engine rotational speed at that time. In addition, the pump delivery pressure Pp is the minimum value which is determined by the unload valve 26, and the second target displacement which is calculated by the input torque control portion 62 becomes the maximum value $\theta Amax$. Therefore, the minimum-value selecting portion 64 selects the first target displacement $\theta Lmin$ which is the LS control value, and the stand-by flow rate of the hydraulic pump 1 becomes a relatively small delivery flow rate Qs which is represented by the product of the first minimum target displacement $\theta Lmin$ and the engine rotational speed.

If the operator manipulates the manipulating lever 58 in the above-described state, the load sensing control in which the pump pressure is kept to a value higher than the load pressure of the hydraulic actuator by a constant difference pressure $\Delta PLSR$ is carried out. Through this control operation, as the opening area of the control valve 20A is increased in proportion to the manipulation amount of the manipulating lever 58 to increase a required delivery flow rate, the displacement of the hydraulic pump 1 is increased. At this time, the pump delivery flow rate is moderately increased because the stand-by flow rate is relatively small.

When the load pressure is heightened and the second target displacement $\theta A$ calculated in the input torque control portion 62 becomes smaller than the target displacement output from the maximum-value selecting portion 63c, the second target displacement $\theta A$ is selected in the minimum-value selecting portion 64.

Therefore, the input torque of the hydraulic pump 1 is so controlled that it does not exceed the output torque of the engine 27, and occurrence of engine stall can be prevented.

(2) In a state where the manipulating lever 58 and the travelling pedal 6a are in non-operation state and each of the control valves 2 and 20A is in its neutral position, when the response speed selecting switch SW3 is in on-state and the quick mode is selected, the selection signal SS is in high-level state and the switch 63b is closed. Therefore, the maximum value selecting portion 63c is supplied with the third target displacement $\theta O$ and the LS control value $\theta L$ from the LS control portion 61. When each of the control valves 2 and 20A is in its neutral position, the first target displacement $\theta L$ calculated in the LS control portion 61 becomes a value $\theta Lmin$ which is minimum for the engine rotational speed at that time. Therefore, if the third target displacement $\theta O$ is set to a value larger than $\theta Lmin$, the maximum-value selecting portion 63c necessarily selects and outputs the third target displacement $\theta O$ at the non-operation time of the control valve.

In addition, at the non-operation time of the control valve, the second target displacement calculated in the input torque control portion 62 becomes the maximum-value $\theta Amax$ as described above. Therefore, the minimum-value selecting portion 64 selects the third target displacement $\theta O$ which is set in the stand-by flow rate control portion 63, and the stand-by flow rate of the hydraulic pump 1 becomes a relatively large delivery flow rate $Qq$ ($>Qs$) which is represented by the product of the third target displacement $\theta O$ and the engine rotational speed.

When the operator manipulates the manipulating lever 58 in this state, the load sensing control calculation as described above is carried out in the LS control portion 61, and the opening of the control valve 20A is increased in proportion to the manipulating amount of the manipulating lever 58 to increase the required delivery flow rate. In accordance with the increase of the required delivery flow rate, the first target displacement $\theta L$ is increased. At this time, irrespective of the manipulation of the manipulating lever 58, the displacement of the hydraulic pump 1 is set to the third target displacement value $\theta O$ until the first target displacement $\theta L$ is larger than the third target displacement $\theta O$. Therefore, if the quick mode is selected in an operating condition in which the manipulating lever 58 is rapidly manipulated, the pump delivery flow rate is increased with high responsibility while following the manipulation of the manipulating lever 58 because the stand-by flow rate is relatively large.

In this case, when the second target displacement $\theta A$ is larger than the third target displacement $\theta O$ or first target displacement $\theta L$, the minimum-value selecting portion 64 also selects the second target displacement $\theta A$, and thus the input torque of the pump is prevent from exceeding the output torque of the engine.

As described above, according to the first embodiment, when each of the control valves 2 and 20a is in its neutral position, the displacement of the hydraulic pump 1, that is, the stand-by flow rate can be altered by the manipulation of the response speed selecting switch SW3, so that the actuator is moderately operated in accordance with the fine manipulation of the operating member to thereby improve the fine operation in the normal mode where the stand-by flow rate is small while the actuator is quickly operated in accordance with the rapid manipulation of the operating member to thereby improve the responsibility in the quick mode where the stand-by flow rate is large.

In FIG. 1, if the third target displacement $\theta O$ is set to be larger than the maximum value $\theta Amax$ output from the input torque control portion 62, the displacement of the pump is controlled through the input torque control at all times when the response speed selecting switch SW3 is switched on while the displacement of the pump is controlled through any one of the load sensing control and the input torque control in accordance with the operating condition when the switch SW3 is switched off.

The response speed selecting switch SW3 may comprise a pressure switch which is switched on, for example, when the travelling pilot pressure is above a predetermined value. With this construction, at the vehicle travelling, the stand-by flow rate becomes larger and thus the responsibility of the start of the vehicle travelling can be improved. Further, a pressure switch, which is switched on by the pilot pressure for controlling actuators for which another responsibility is required other than the actuator of the vehicle travelling, may be provided in place of the response speed selecting switch SW3, and both of this pressure switch and the response speed selecting switch SW3 may be provided.

Second Embodiment

Figure 4:
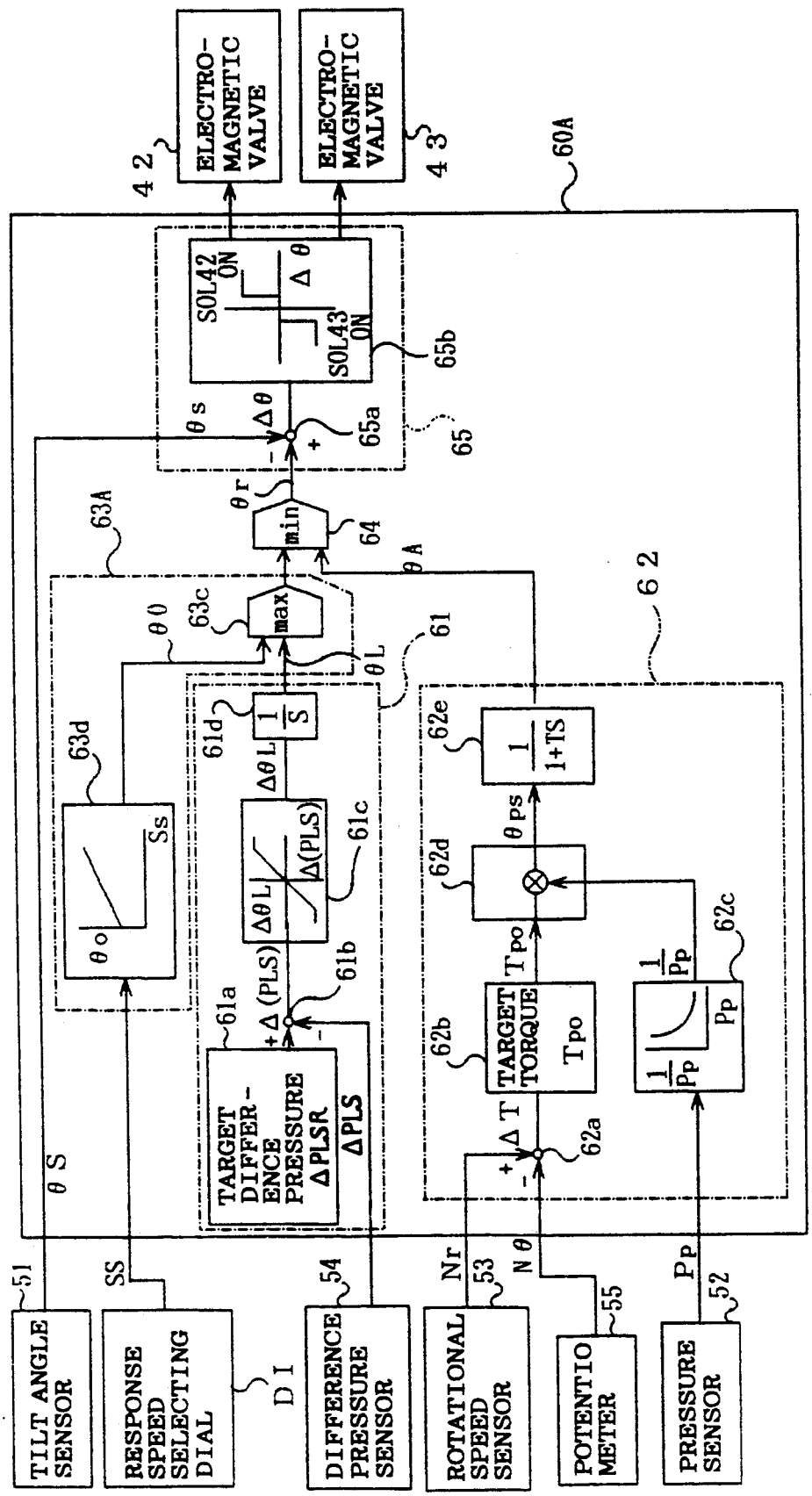
FIG. 4 is a block diagram showing a pump control system for a hydraulic control apparatus according to a second embodiment of this invention.

FIG. 4 shows a second embodiment. In the first embodiment the third target displacement $\theta O$ for altering the stand-by flow rate is a fixed value. However, in the second embodiment, the third target displacement $\theta O$ can be set to any value in accordance with a manipulation amount of an operation member by the operator.

The different point from the first embodiment will be mainly described.

A response selection dial DI such as a volume for outputting an electrical signal in accordance with a rotation manipulating amount thereof is provided in place of the response speed selecting switch SW3, and the stand-by flow rate control portion 63A is provided with a function generator 63d for outputting a third target displacement $\theta O$ in accordance with the output voltage of the dial DI in place of the setting unit 63a and the switch 63b.

With this construction, the stand-by flow rate can be set to any value in accordance with an operator's preference or an operating condition, and thus a hydraulic construction machine which is favorite for any one and has such an improved operation performance as to be broadly matched with various operating conditions can be provided.

When the maximum output value of the function generator 63d is set to be larger than the maximum output value of the input torque control portion 62, the displacement of the pump can be controlled only through the input torque control in the same manner as described above.

Third Embodiment

Figure 5:
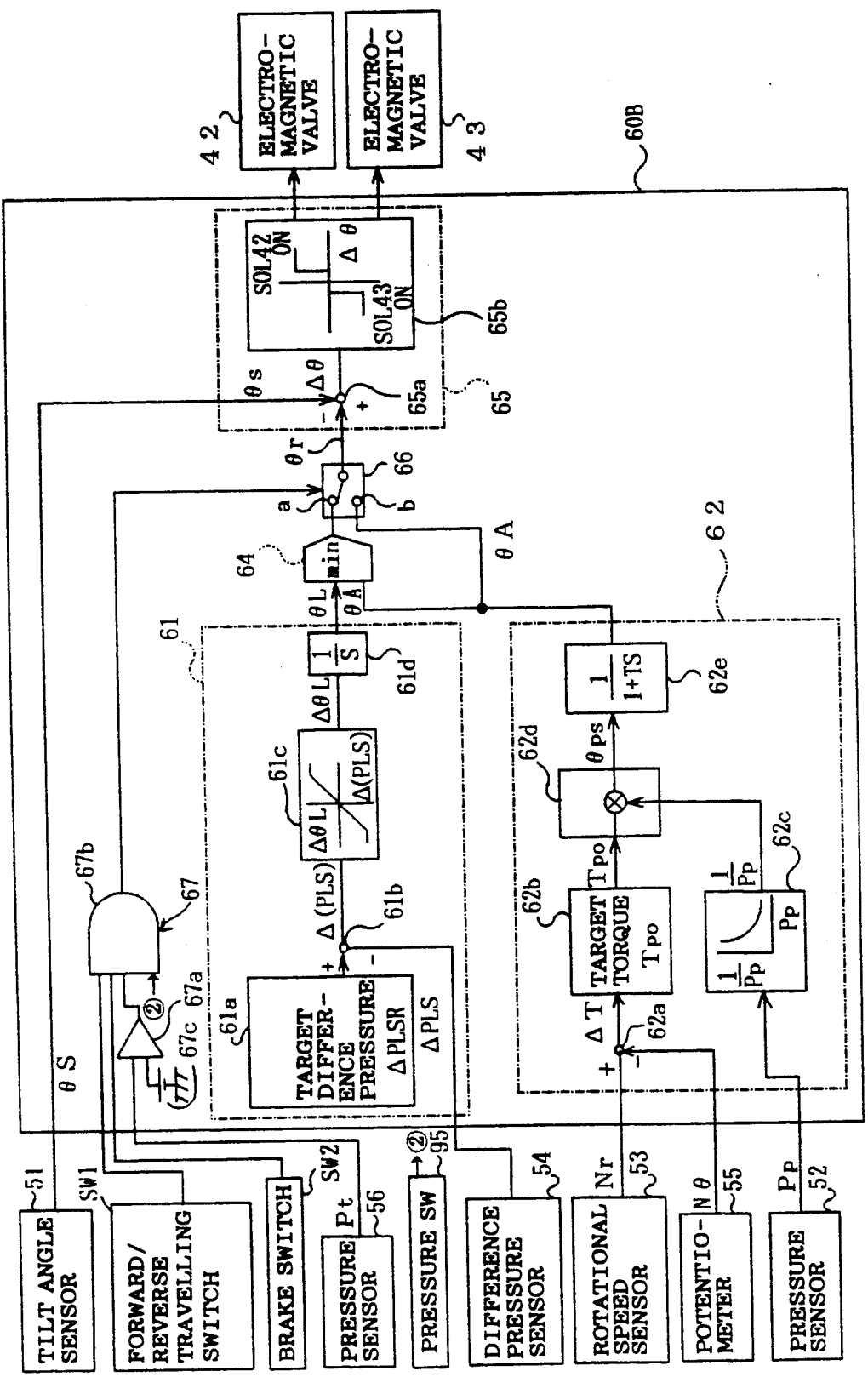
FIG. 5 is a block diagram showing a pump control system for a hydraulic control apparatus according to a third embodiment of this invention.
Figure 6:
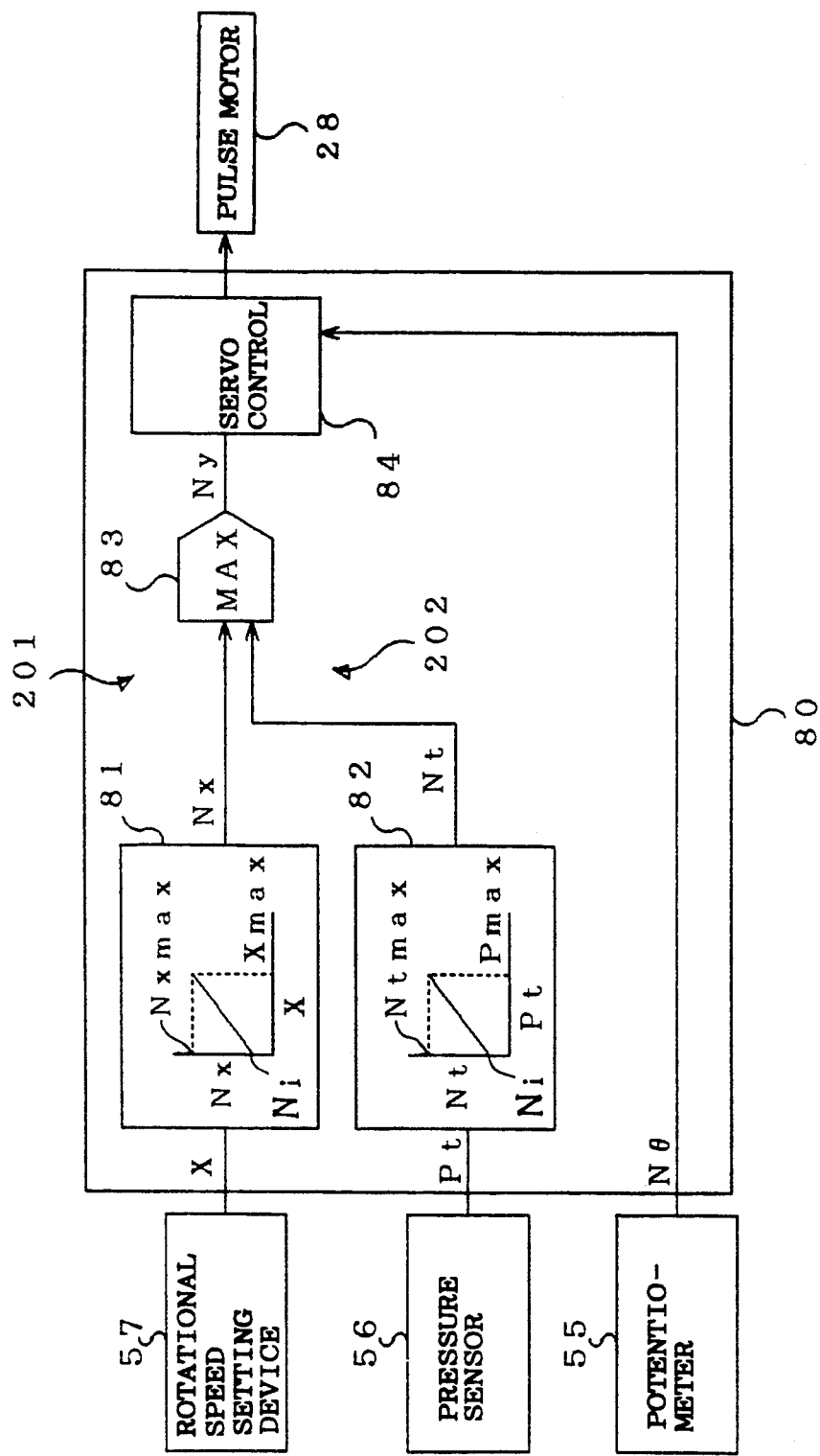
FIG. 6 is a block diagram showing an engine control system.
Figure 7:
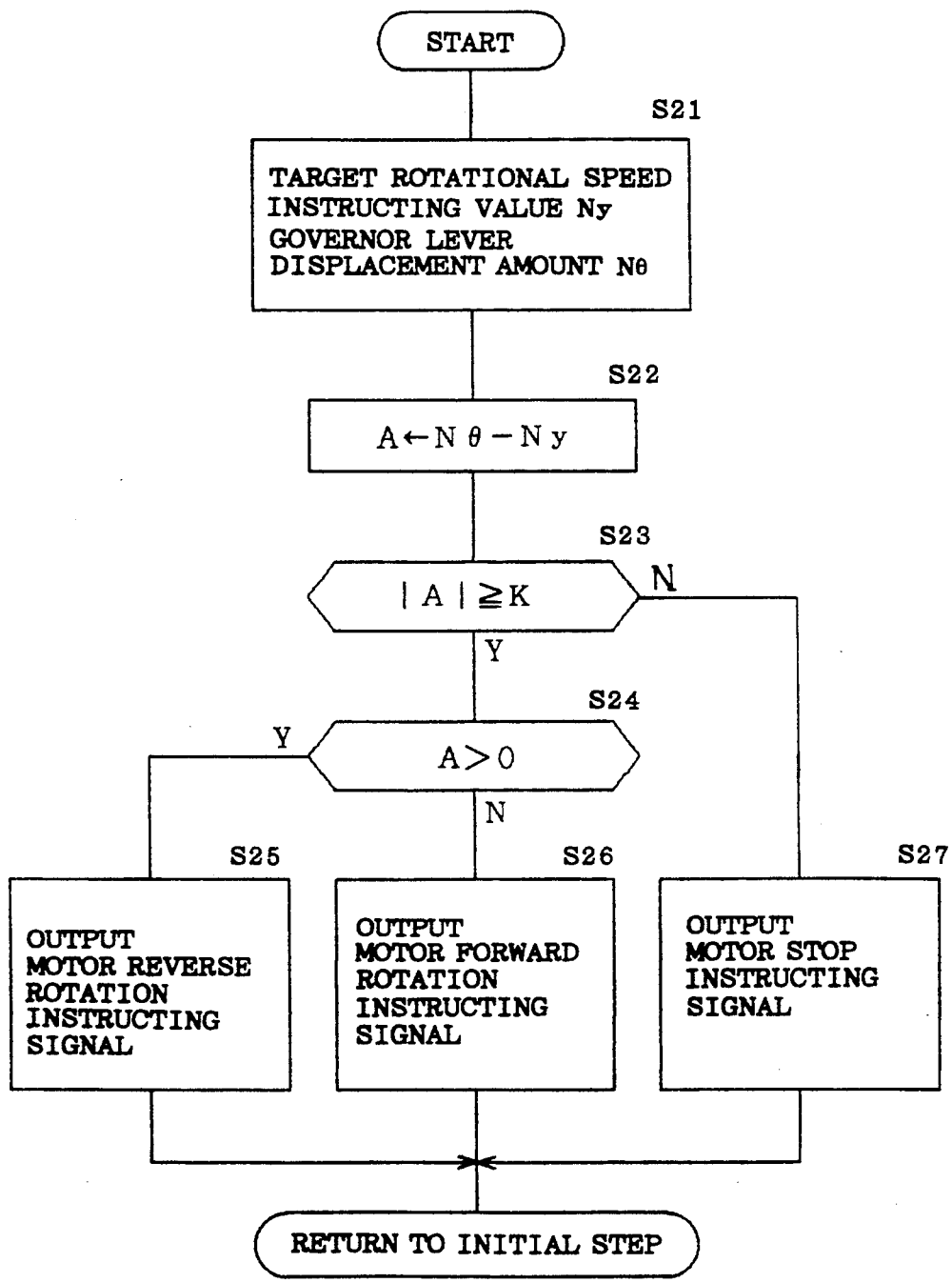
FIG. 7 is a flowchart for a control procedure for an engine rotational speed.

FIGS. 5 to 7 show a third embodiment. In the first and second embodiments, the stand-by flow rate control portions 63 and 63A are provided independently of each of the LS control portion 61 outputting the first target displacement $\theta L$ and the input control portion 62 outputting the second target displacement $\theta O$, and the stand-by flow rate is altered through the manipulation of the operation member by the operator. In the third embodiment, the stand-by delivery flow rate control portion is omitted, and the load sensing control is inhibited when a special operating condition is detected to thereby control the displacement of the hydraulic pump through the input torque limiting control In the third embodiment, when the vehicle travels, the load sensing control and the input torque limiting control are selectively carried out, and when the work is carried out using the manipulating lever 58 together with controlling the engine rotational speed by the travelling pedal 6a, the input torque limiting control is carried out using no load sensing control.

The main portion of the whole circuit of the hydraulic construction machine is the same as shown in FIGS. 2 and 3, and the different point will be mainly described The controller 50 is equipped with a first control circuit portion 60B as shown in FIG. 5 and a second control circuit portion 80 as shown in FIG. 6. In the first control circuit portion 60B as shown in FIG. 5, the stand-by flow rate control portion 63 as shown in FIG. 1 is omitted, a selection switch 66 is provided at a rear stage of the minimum-value selecting portion 64, and a judgement portion 67 serving as a switch control portion of the switch 66 is provided.

The judgment portion 67 includes a comparator 67a and an AND gate circuit 67a, and it is so constructed that it outputs a high-level signal when the manipulating lever 58 is manipulated while the engine rotational speed is controlled by the travelling pedal 6a, so that the work is carried out. The comparator 67a outputs a high-level signal when the pilot pressure Pt detected by the pressure sensor 56 is higher than a predetermined pressure which is beforehand set (by a reference power supply 67c), and the output signal thereof is input to the AND gate circuit 67b. The AND gate circuit 67b is also supplied with a signal representing an on/off state of the brake switch SW2 and a signal representing a switching state of the forward/reverse travel change-over switch SW1, and the AND gate circuit 67b is enabled when the following four conditions are wholly satisfied:

(1) the brake switch SW2 is on (high-level signal is output), (2) the forward/reverse change-over switch SW1 is in its N-position (high-level signal is output), (3) the pilot pressure Pt as described above is higher than the predetermined value (high-level signal is output from the comparator 67a), and (4) the working pilot pressure switch 95 is on (high-level signal is output).

In a case where the work is carried out at the vehicle-stopped state while the rotational speed of the engine 27 is controlled through the manipulation of the travelling pedal 6a, the above four conditions are wholly satisfied and thus the high-level signal is output from the AND gate circuit 67b.

The selection switch 66 is switched to an a-contact point when the AND gate circuit 67b is in off-state (when the low-level signal is output and the vehicle travels) to select the output of the minimum-value selecting portion 64. That is, smaller one of the first target displacement θL and the second target displacement θA is selected as the displacement instructing value θr. When the AND gate circuit 67b is enabled (when the high-level signal is output and the work under the specific operating condition as described above is carried out), the selection switch 66 is switched to a b-contact point to select the output of the torque control portion 62. That is, the second target displacement θA is selected as the displacement target instructing value θr. The selected displacement instructing value θr is input to the servo control portion 66.

The controller 50 also includes the second control circuit portion 80 as shown in FIG. 6.

In the second control circuit portion 80, a reference numeral 81 represents a first target rotational speed calculating portion to which a signal corresponding to the manipulation amount X of the fuel lever 57a of the rotational speed setting device 57 is input to determine a first target rotational speed Nx which corresponds to the manipulation amount X. A reference numeral 82 represents a second target rotational speed calculating portion supplied with the pilot pressure Pt detected by the pressure sensor 56 which indicates the manipulation amount of the travelling pedal 6a, and it serves to determine a second target rotational speed Nt which corresponds to the pilot pressure Pt. Here, in the first target rotational speed calculating portion 81, the manipulation amount X and the first target rotational speed Nx are set in such a relationship that the first target rotational speed Nx is linearly increased from an idle rotational speed Ni as the displacement amount X is increased. In the second target rotational speed calculating portion 82, the pilot pressure Pt and the second target rotational speed Nt are set in such a relationship that the second target rotational speed Nt is linearly increased from the idle rotational speed Ni as the pilot pressure Pt (pedal manipulation amount) is increased. Further, the maximum value Nxmax of the first target rotational speed Nx is set to be lower than the maximum rotational speed which can be output by the engine 27, and the maximum value Ntmax of the second target rotational speed Nt is set to be substantially equal to the maximum rotational speed of the engine 27. Therefore, the maximum value Ntmax of the target rotational speed Nt is larger than the maximum value Nxmax of the target rotational speed Nx.

Larger one of the target rotational speeds Nx and Nt is selected in the maximum-value selecting portion 83, and set as a target rotational speed instructing value Ny. In the servo control portion 84, the target rotational speed instructing value Ny is compared with the control rotational speed Nθ indicated with the displacement amount of the governor lever 27b which is detected by the potentiometer 55, and the pulse motor 28 is so controlled that both are coincident with each other in accordance with the procedure as shown in FIG. 7.

At a step S21 in FIG. 7, the target rotational speed instructing value Ny and the control rotational speed Nθ indicated with the displacement amount of the governor lever are read in, and the process goes to a step S22. At the step S22, a result of Nθ−Ny is stored as a difference rotational speed A in a memory, and at a step S23 it is judged on the basis of a predetermined reference difference rotational speed K as to whether |A|≧K. If the judgment at the step S23 is "Yes", the process goes to a step S24, and it is judged as to whether difference rotational speed A>0. If A>0, the control rotational speed Nθ indicated by the displacement amount of the governor lever is larger than the target rotational speed instructing value Ny, that is, the control rotational speed is larger than the target rotational speed. Therefore at a step S25, a signal instructing the reverse rotation of the motor is output to the pulse motor 28 to decrease the engine rotational speed. Through this operation, the pulse motor 28 is reversely rotated and the rotational speed of the engine 27 is reduced.

On the other hand, if $A \leq 0$, the control rotational speed $N\theta$ indicated by the displacement amount of the governor lever is smaller than the target rotational speed Ny, that is, the control rotational speed is lower than the target rotational speed. Therefore at a step S26, a signal instructing the forward rotation of the motor is output to increase the engine rotational speed. Through this operation, the pulse motor 28 is forwardly rotated, and the rotational speed of the engine 27 is increased. If the judgment at the step S23 is "No", the process goes to a step S27 to output a motor stopping signal, so that the rotational speed of the engine 27 is kept to a constant value. After processes at steps 25 to S27 are executed, the process returns to the initial step.

The operation of the third embodiment thus constructed will be next described.

When the work such as a digging is carried out by driving the front attachment, the brake switch SW2 is switched on and the forward/reverse travelling change-over switch SW1 is switched to the N-position. The control of the engine rotational speed can be performed by the fuel lever 57a or the travelling pedal 6a. When the control of the engine rotational speed is carried out using no travelling pedal 6a, the fuel lever 57a of the rotational speed setting device 57 is kept at the maximum stroke position or at a proper intermediate position of a stroke lower than the maximum stroke. In a case where the engine rotational speed is controlled using the fuel lever 57a as described above, the travelling pilot pressure Pt which is input to the second target rotational speed calculating portion 82 of the second control circuit portion 80 is zero, so that the second target rotational speed Nt calculated in the above calculating portion 82 becomes the idle rotational speed Ni. Further, the manipulation amount X of the fuel lever which is input to the first target rotational speed calculating portion 81 is a larger value other than zero, so that the first target rotational speed Nx calculated in the above calculating portion 81 becomes a value which is lager than the idle rotational speed Ni and corresponds to the stroke position of the fuel lever 57a. Therefore, in the selecting portion 83, the target rotational speed Nx is selected as the target rotational speed instructing value Ny, and the engine 27 is controlled to the target rotational speed Nx. Through this operation, the engine rotational speed is controlled so as to be kept to a constant speed which corresponds to the stroke position of the fuel lever.

On the other hand, the following process is carried out in the first control circuit portion 60B of the controller 50.

In a work where the engine rotational speed is controlled by the fuel lever 57a, the brake switch SW2 is switched on and the forward/reverse travelling change-over switch SW1 is in its N-position (neutral position), and the pressure switch 95 is switched on through the manipulation of the working lever 58. However, the pilot pressure Pt is lower than the predetermined value because the travelling pedal 6a is not manipulated (the conditions (1), (2) and (4) of the conditions (1), (2), (3) and (4) as described above are satisfied, but the condition (3) is not satisfied), and the AND gate circuit 67b constituting the judging portion 67 is enabled. Therefore, the selecting switch 66 selects the signal from the minimum-value selecting portion 64. That is, smaller one of the first and third target displacements $\theta L$ and $\theta A$ is selected as the displacement instructing value $\theta r$, and the displacement of the hydraulic pump 1 is controlled so as to be equal to the selected displacement instructing value $\theta r$.

As described above, when the work is carried out through the control of the engine rotational speed using the fuel lever 57a, the delivery pressure of the hydraulic pump 1 is controlled so as to be higher than the load pressure of the hydraulic motor 3 by the target difference pressure $\Delta PLSR$ using the first target displacement $\theta L$ (the load sensing control is carried out), and the input torque of the hydraulic pump 1 is controlled so as not to exceed the target torque Tp0 using the second target displacement $\theta A$ (the input torque limiting control is carried out).

Although, the engine rotational speed is controlled by the travelling pedal 6a when the vehicle travels, the selecting switch 66 is switched to the a-contact because the brake switch SW2 is switched off, and the pump tilt angle is controlled with smaller one of $\theta L$ and $\theta A$.

In a work where the rotational speed of the engine is controlled through the manipulation of the travelling pedal 6a to carry out the speed control of the front attachment, the brake switch SW is switched on, the forward/reverse switch SW1 is switched to the neutral N-position, and the fuel lever 57a is kept at the minimum stroke position. Upon step-on of the pedal 6a in this state, the first target rotational speed calculating portion 81 of the second control circuit portion 80 is supplied with the fuel lever manipulation amount $X = 0$, so that the first target rotational speed Nx calculated in the calculating portion 81 becomes equal to the idle rotational speed Ni. Further the second target rotational speed calculating portion 82 is supplied with the travelling pilot pressure Pt corresponding to the manipulation amount (step-on amount) of the travelling pedal 6a, so that the second target rotational speed Nt calculated in the calculating portion 82 becomes a value which is higher than the idle rotational speed Ni and corresponds to the manipulation amount of the travelling pedal 6a. Therefore, the target rotational speed Nt is selected as the target rotational speed instructing value Ny in the selecting portion 83, and the rotational speed of the engine 27 is controlled to the target rotational speed Nt. As a result, the engine rotational speed is controlled in accordance with the operation amount of the travelling pedal 6a, so that the engine rotational speed is increased as the operation amount of the travelling pedal 6a is increased while the engine rotational speed is decreased as the travelling pedal 6a is returned.

On the other hand, the following process is carried out in the first control circuit portion 60B.

In a work where the engine rotational speed is controlled by the travelling pedal 6a, the brake switch SW2 is turned on, the forward/reverse change-over switch SW1 is in its N-position (neutral position), the pilot pressure Pt has a value higher than the predetermined value through the operation of the travelling pedal 6a, and the pressure switch 95 is switched on by manipulating the working lever 58. Therefore, all of the conditions (1), (2), (3) and (4) as described above are satisfied, so that the AND gate circuit 67b serving as the judging portion 67 is enabled. Through this operation, the selecting switch 66 is switched to the b-contact point, so that the second target displacement $\theta A$ calculated in the torque control portion 62 is selected as the displacement instructing value $\theta r$. The displacement of the hydraulic pump 1 is so controlled as to be equal to the selected displacement instructing value θr. That is, the load sensing control as described above is not carried out, and only the input torque limiting control is carried out. Therefore, in a range below the second target displacement which is determined by the input torque control, the delivery flow rate of the hydraulic pump 1 is increased or decreased substantially in proportion to the above-described increase/decrease control of the engine rotational speed using the travelling pedal 6a, so that the driving of the front attachment such as the boom can be controlled at a desired speed.

If the selecting switch 66 as shown in FIG. 5 is so designed as to be freely switchable by the operator, the selective use of the load sensing control and the input torque control can be performed on the basis of the operator's judgment. As supplementally described in the first and second embodiments, even in a case of adopting the control system where on the basis of the operator's judgment the load sensing control is inhibited and the pump displacement is controlled through the input torque control, the same effect as the third embodiment can be obtained.

In the above embodiment, the existing travelling pedal 6a is also used as operating means for the engine rotational speed control. However, the operating means is not limited to the travelling pedal 6a, and may be another operation member (preferably, a pedal). Further, in the above embodiment the travelling hydraulic motor 4 and the working hydraulic cylinder 20A are provided as the hydraulic actuator. However, the hydraulic actuator may be constructed so as to have plural working hydraulic cylinders 20A and a hydraulic motor for a turning of the upper swing body of the vehicle. Still further, the working hydraulic cylinder 20A is not limited to a cylinder for driving of the boom, and may be a cylinder for driving of the arm or the bucket.

Figure 8:
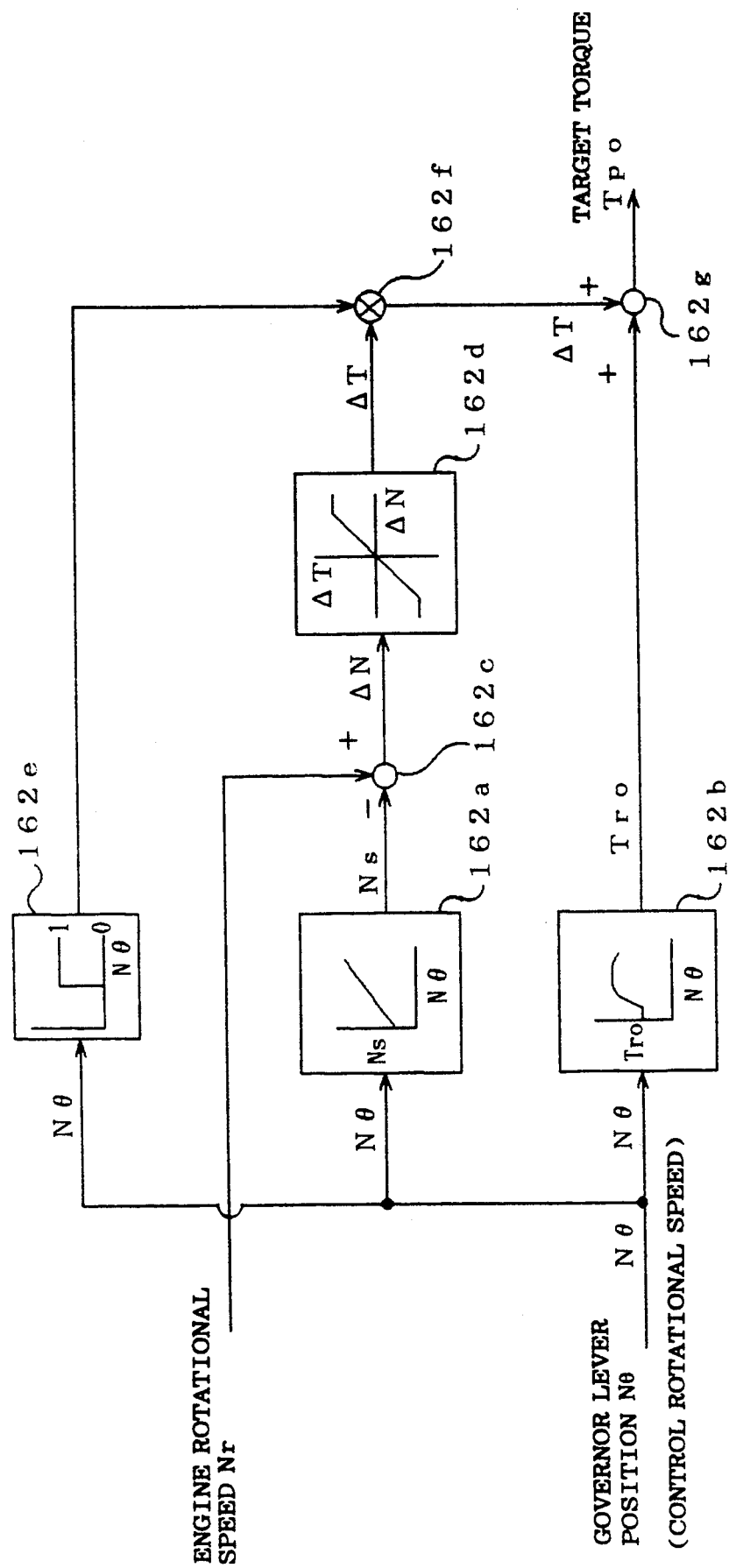
FIG. 8 is a detailed block diagram showing an input torque control portion in the first to third embodiments.

FIG. 8 is a detailed block diagram of the torque control portion 62 of the first to third embodiments as described above.

The control rotational speed Nθ which corresponds to the governor lever position detected by the potentiometer 55 is input to a reference rotational speed calculating portion 162a and a torque calculating portion 162b. The reference rotational speed calculating portion 162a calculates a speed sensing reference rotational speed Ns in accordance with the input control rotational speed Nθ on the basis of a characteristic as shown in the figure. The reference rotational speed Ns is increased as the control rotational speed Nθ is increased. In addition, the torque calculating portion 162b calculates the target torque Tro in accordance with the input control rotational speed Nθ on the basis of a characteristic as shown in the figure. An adder 162c serves to calculate the deviation ΔN (=Nr−Ns) between the actual engine rotational speed Nr and the reference rotational speed Ns as described above, and a correction torque calculating portion 162d serves to calculate a correction torque ΔT in accordance with the rotational deviation ΔN on the basis of a characteristic as shown in the figure. The correction torque is positive when the rotational speed deviation ΔN is positive, and is negative when the rotational speed deviation ΔN is negative. In addition, the correction torque |ΔT| is increased with increase of |ΔN|.

A function generator 162e outputs a signal representing "0" when the control rotational speed Nθ is lower than a predetermined value, and "1" when the control rotational speed Nθ is equal to or above the predetermined value, and the signal is multiplied by the correction torque ΔT in a multiplier 162f. That is, the correction torque ΔT is effective only when the control rotational speed Nθ is equal to or above the predetermined value. ΔT is added to the target torque Tro as described above in the adder 162g, and the result of this addition is output as the target torque instructing value Tpo. The target displacement θA is calculated on the basis of the target torque instructing value Tpo.

According to the input torque control portion as described above, when the engine has a margin for a torque, the correction torque ΔT becomes positive so as to cause the target torque instructing value Tpo to be increased. On the other hand, when the engine is in an over-torque state, the correction torque ΔT becomes negative so as to cause the target torque instructing value Tpo to be decreased. Therefore, the target torque can be approached to a rated torque, and thus the torque can be effectively set.

With the input torque control portion, there occurs no problem in a case where the operation is carried out with keeping the engine rotational speed to a constant value using the fuel lever 57a, however, the following problem occurs in a case where the operation of the vehicle is carried out by increasing/decreasing the engine rotational speed using the travelling pedal 6a.

When the travelling pedal 6a is rapidly stepped on to a full throttle position, the governor lever 27 is immediately operated to a full throttle position by the pulse motor 28, so that the control rotational speed Nθ is increased, and the speed sensing reference rotational speed Ns is also immediately increased. However, when the operation amount of the governor lever reaches the maximum value, there is a time lag until the actual rotational speed of the engine is increased up to its maximum value. The rotational speed deviation ΔN is negative during this time lag, and the correction torque ΔT is also negative. Therefore, the target torque instructing value Tpo is lowered, so that the displacement of the hydraulic pump is decreased, and the rise-up of the rotational speed is deteriorated.

In this connection, an embodiment for improving the rise-up characteristic of the engine rotational speed as described above is shown in FIG. 9.

Figure 9:
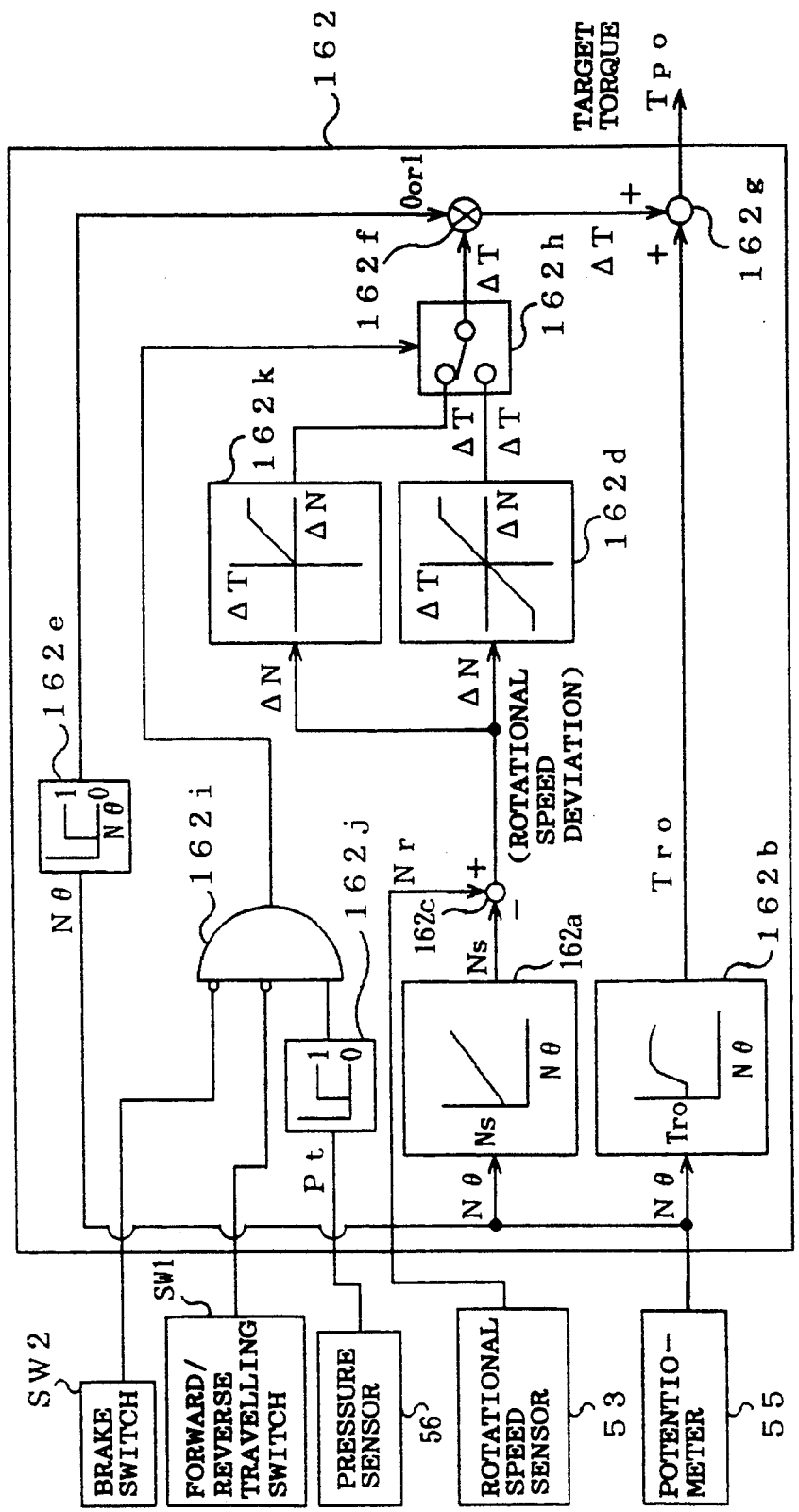
FIG. 9 is a detailed block diagram showing the input torque control portion to solve a problem occurring in the input torque control portion.
Figure 10:
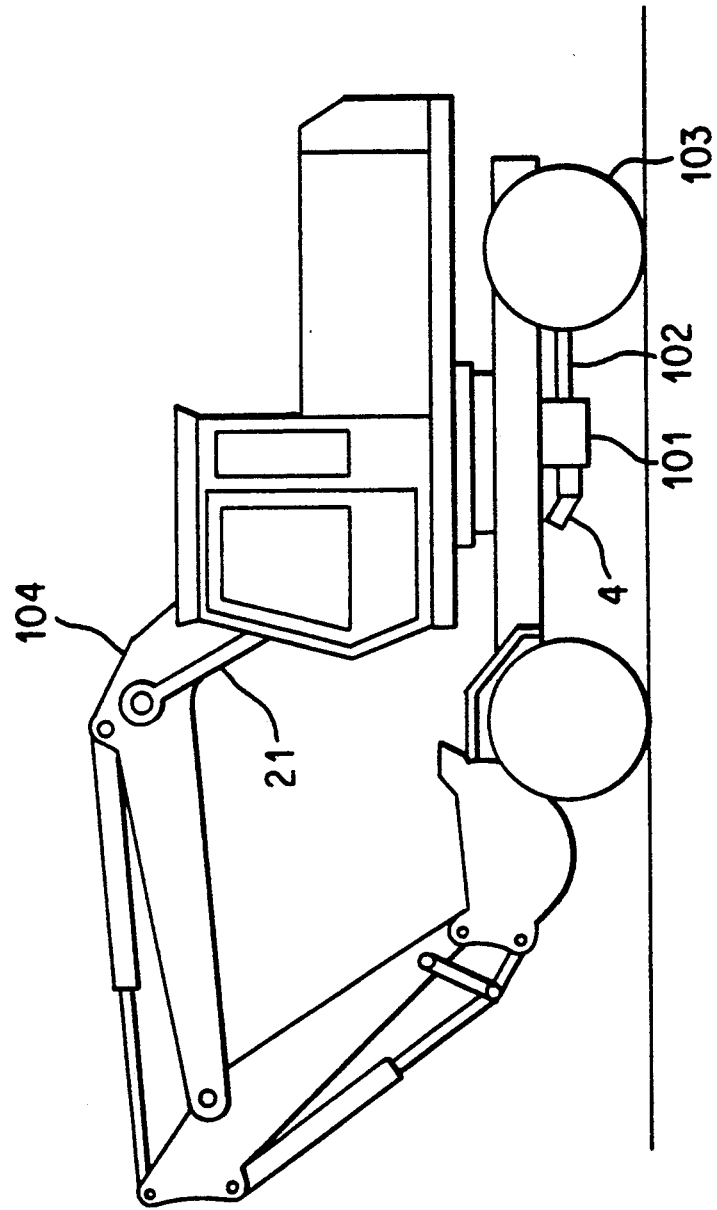
FIG. 10 is a side view of a wheel-type hydraulic shovel.

FIG. 9 shows the input torque control portion 162 of the first control circuit portion 60 inside of the controller 50. The same elements as those of FIG. 8 are represented by the same reference numerals, and the difference point will be mainly described.

The input torque control portion 162 is equipped with a torque calculating portion 162k in parallel to the torque calculating portion 162d. The torque calculation portion 162k has a different characteristic from those of the torque calculation portion 162d. The output value of each torque calculating portion is input to the selecting portion 162h. In the torque calculating portion 162k, the correction torque ΔT becomes positive and increases with increase of ΔN when the rotational speed deviation ΔN is positive. On the other hand, when ΔN is negative, ΔT is zero. That is, only a control for increase of input torque is carried out.

The input torque control portion 162 includes an AND gate circuit 162i, and the AND gate circuit 162i is input with a signal representing an on/off state of the brake switch SW2, a signal representing a manipulation position of the forward/reverse change-over switch SW1, and an output of a function generator 162j. The function generator 162j outputs "1" when an operation amount of the travelling pedal 6a is equal to or above a predetermined amount, and "0" when it is smaller than the predetermined amount, and is supplied with a signal Pt representing the operation amount of the travelling pedal 6a which is an output of the pressure sensor 56. Therefore, when the following conditions are satisfied, that is, when the vehicle travels the AND gate circuit 162i is enabled to input a high-level signal to a selection switch 162h, and the selection switch 162h selects the torque calculating portion 162k;

(1) the brake switch SW2 is in off-state (the switch SW2 outputs a low-level signal), (2) the forward/reverse change-over valve 8A is switched to a position other than the N-position (the forward/reverse travel change-over switch SW1 outputs a low-level signal), and (3) the travelling pedal 6a is stepped on by an amount larger than the predetermined amount (the function generator 162j outputs a high-level signal).

According to the input torque control portion 162 thus constructed, when the travelling pedal 6a is stepped on to the full throttle position while travelling of the vehicle, the control rotational speed $N\theta$ which is a detection value of the governor lever position becomes the maximum value, and interlockingly with the maximum value of the control rotational speed, the speed sensing reference rotational speed Ns also becomes the maximum value. A time lag is required until the actual rotational speed of the engine reaches a value corresponding to the maximum value of the governor lever, and during this time lag the rotational speed deviation $\Delta N$ is negative. However, since the torque calculating portion 162k is selected while travelling of the vehicle, the correction torque $\Delta T$ is not negative and is equal to zero even when the rotational speed deviation $\Delta N$ becomes negative. Therefore, the target torque instructing value Tpo is not reduced, and the displacement of the hydraulic pump 1 is not reduced, so that the acceleration performance for vehicle travelling in this case can be more improved than that in the case of using the input torque control portion as shown in FIG. 8.

Further, since the torque calculating portion 162d is selected by the selection switch 162h in a non-travelling operation such as a digging work, like the conventional input torque control portion, the pump displacement is reduced to reduce the engine input torque when the engine has no surplus for the torque, so that the useless engine stall can be prevented.

Such a construction for assuring the acceleration performance may be applied to a turning operation of the upper swing body of the vehicle as well as a travelling operation.

INDUSTRIAL APPLICABILITY

The hydraulic control apparatus of this invention as described above is effectively applied particularly to various hydraulic construction machines equipped with a diesel engine, such as a wheel-type hydraulic shovel, a crawler-type hydraulic shovel, a hydraulic crawler crane, a wheel loader, etc.

What is claimed is:

1. A hydraulic control apparatus for a hydraulic construction machine including:

a variable displacement hydraulic pump which is driven by a prime mover;

a first hydraulic actuator which is driven by delivery oil from said hydraulic pump;

a first control valve which is provided between said hydraulic pump and said first hydraulic actuator and serves to control pressured oil to be supplied to said first hydraulic actuator;

first determination means for determining a first target displacement to keep a delivery pressure of said hydraulic pump to a value higher than a load pressure of the first hydraulic actuator by a predetermined target value;

second determination means for determining a second target displacement by which an input torque is limited on the basis of said delivery pressure of said hydraulic pump; and displacement control means for controlling said displacement of said hydraulic pump such that said displacement is equal to at least one of said first and second target displacements, said hydraulic control apparatus further including instructing means for issuing instructions that an oil flow rate of said variable displacement hydraulic pump becomes a predetermined minimum value, and limiting means for imposing limitation in response to said instructions on a signal indicating said first target displacement which is determined and output by said first determination means, so that the minimum oil flow rate becomes larger than that before limitation is imposed at least when said hydraulic pump is driven with a light load.

2. The hydraulic control apparatus as claimed in claim 1, wherein said instructing means includes limit-signal output means for outputting a limit signal indicating a value larger than the minimum value of said first target displacement which is output from said first determination means and limiting-operation instructing signal output means including a manually operated member, for outputting a limiting-operation instructing signal causing said limit-signal output means to be activated through an operation of said manually operated member, said limiting means includes maximum-value selecting means for comparing the value indicated by said limit signal and said first target displacement output from said first determination means to select and output a larger one of these values, and said displacement being controlled so as to be equal to a smaller one of said target displacement selected by the maximum-value selecting means and said second displacement target.

3. The hydraulic control apparatus as claimed in claim 2, wherein said manually operated member of said limiting-operation instructing signal output means comprises a manually operable switch.

4. The hydraulic control apparatus as claimed in claim 2, wherein said limiting-operation instructing signal output means outputs at least two kinds of limiting-operation instructing signals, and said limit-signal output means outputs a target displacement whose value corresponds to an input limiting-operation instructing signal.

5. The hydraulic control apparatus as claimed in claim 4, wherein said manually operated member outputs at least two kinds of limiting-operation instructing signals in accordance with the manipulation amount of said manually operated member.

6. The hydraulic control apparatus as claimed in claim 1, wherein said displacement control means includes;

minimum-value selecting means for selecting a smaller one of said first target displacement output from said first determination means and said second target displacement output from said second determination means, said limiting means includes selection means for selecting any one of said target displacement selected by said minimum-value selecting means and said second target displacement, and said instructing means includes selection instructing signal output means for outputting a selection instructing signal for instructing the selection of the output of said minimum-value selecting means or said second target displacement as said target displacement to be selected in said selection means.

7. The hydraulic control apparatus as claimed in claim 1, wherein said instructing means includes;

limiting signal output means for outputting a limiting signal having a value larger than the minimum value of said first target displacement output from said first determination means, limiting-operation instructing means for operating said limiting signal output means in response to a manipulation of an operating member for said hydraulic actuator, maximum-value selecting means for comparing the value of said limiting signal and said first target displacement output from said first determination means to select a larger one therefrom and outputting the selected one, and, said displacement control means controls said displacement as to be equal to a smaller one of said target displacement selected by said maximum-value selecting means and said second target displacement.

8. The hydraulic control apparatus as claimed in claim 2, wherein said hydraulic construction machine further includes;

first operating means which is manipulated to keep the rotational speed of said prime mover to an arbitrary rotational speed, second operating means which is manipulated to control the rotational speed of said prime mover and returned to an initial position of low rotational speed when the manipulating force is released, rotational speed control means for controlling the rotational speed of said prime mover in accordance with said first and second operating means, a second hydraulic actuator which is driven by said delivery oil from said hydraulic pump, and, a second control valve which is provided between said hydraulic pump and said second hydraulic actuator and serves to control the pressured oil which is supplied to said second hydraulic actuator, and wherein, said limiting operation instructing signal output means is judging means for outputting a selection instructing signal indicating the selection of said second target displacement on the basis of the discrimination of a state where said first hydraulic actuator is operated while the rotational speed of said prime mover is controlled by said second operating means.

9. The hydraulic control apparatus as claimed in claim 1, wherein said first determination means detects a difference pressure between the pressure of a conduit for intercommunicating said first control valve with said hydraulic pump and the pressure of a conduit for intercommunicating said first control valve with said first hydraulic actuator to calculate a deviation between a predetermined target difference pressure and the detected difference pressure, and calculates said first target displacement on the basis of said deviation, and wherein, said second determination means detects a deviation between an actual rotational speed of a diesel engine serving as said prime mover and a control rotational speed indicated by the position of a governor lever of said diesel engine, calculates on the basis of the detected deviation a target torque with which said diesel engine suffers from no engine stall, and detects said delivery pressure of said variable displacement hydraulic pump to calculate said second target displacement on the basis of the reciprocal of the detected delivery pressure and said target torque.

10. The hydraulic control apparatus as claimed in claim 9, wherein said second determination means includes means for judging the travelling operation, and wherein in the travelling operation said target torque is subjected to only a correction for increasing said target torque when the actual rotational speed is higher than said control rotational speed, and in a non-travelling operation said target torque is subjected to a correction for increasing said target torque when said actual rotational speed is higher than said control rotational speed and a correction for decreasing said target torque when said actual rotational speed is lower than said control rotational speed.

11. In a hydraulic control apparatus for a hydraulic construction machine including;

first operating means which is manipulated to keep the rotational speed of a prime mover to an arbitrary rotational speed, second operating means which is manipulated to control the rotational speed of said prime mover and is returned to an initial position of low rotational speed when the manipulating force is released, rotational speed control means for controlling the rotational speed of said prime mover in accordance with said first and second operating means, a variable displacement hydraulic pump which is driven by said prime mover, a first hydraulic actuator which is driven by a delivery oil from said hydraulic pump, a second hydraulic actuator which is driven by said delivery oil of said hydraulic pump, a first control valve which is provided between said hydraulic pump and said first hydraulic actuator and serves to control a pressured oil supplied to said first hydraulic actuator, a second control valve which is provided between said hydraulic pump and said second hydraulic actuator and serves to control a pressured oil supplied to said second hydraulic actuator, first determination means for determining a first target displacement to keep said delivery pressure of said hydraulic pump to a value higher than load pressure of said first and second hydraulic actuators by a predetermined target value, second determination means for determining a second target displacement by which an input torque is limited on the basis of said delivery pressure of said hydraulic pump, and, displacement control means for controlling said displacement of said hydraulic pump so that said displacement is equal to at least one of said first and second target displacements, said control apparatus further including;

judging means for outputting a discrimination signal on the basis of a discrimination of a state where said first hydraulic actuator is operated while the rotational speed of said prime mover is controlled by said second operating means, wherein, when said discrimination signal is output, said displacement of said variable displacement hydraulic pump is so controlled that it is equal to said second target displacement irrespective of the value of said first target displacement.

12. The hydraulic control apparatus as claimed in claim 11, further including minimum-value selecting means for selecting smaller one of said first and second target displacements, and switching means for outputting said target displacement selected by said minimum-value selecting means when said discrimination signal is not output, and outputting said second target displacement when said discrimination signal is output.

13. The hydraulic control apparatus as claimed in claim 11, further including;

limit signal output means for outputting a limit signal indicating a value lager than the minimum value of said first target displacement, maximum-value selecting means for comparing the value of said limit signal and said first target displacement to select a larger one therefrom and outputting the selected value, minimum-value selecting means for selecting a smaller one of said target displacement output from the maximum value selecting means and said second target displacement, and, limiting operation instructing signal output means including a manually operated member for outputting a limiting-operation instructing signal for actuating said limit-signal output means through manipulation of said manually operated member.

14. The hydraulic control apparatus as claimed in claim 11, wherein said hydraulic construction machine is equipped with a front attachment and capable of travelling, and, said hydraulic actuator comprises a hydraulic cylinder for said front attachment, said second hydraulic actuator comprises a hydraulic motor for machine travelling, said first operating means comprises a manual manipulation member, and said second operating means comprises a pedal-type manipulation member.

15. The hydraulic control apparatus as claimed in claim 14, wherein said manual manipulation member comprises a fuel lever for setting the rotational speed of said prime mover in accordance with the manipulation position of said fuel lever, and said pedal-type manipulation member comprises a travelling pedal with which the opening area of said second control valve can be adjusted in accordance with the operation amount thereof.

16. The hydraulic control apparatus as claimed in claim 15, further including inhibition means for inhibiting the driving of said second hydraulic actuator when said discrimination signal is output.

17. The hydraulic control apparatus as claimed in claim 11, wherein said rotational speed control means includes;

first target rotational speed setting means for setting a first target rotational speed of said prime mover in accordance with the operation amount of said first operating means, second target rotational speed setting means for setting a second target rotational speed of said prime mover in accordance with the operation amount of said second operating means, selection means for selecting a larger one of said first and second target rotational speeds of said prime mover, and, rotational speed increasing/decreasing means for increasing or decreasing the rotational speed of said prime mover so that it is equal to the selected target rotational speed.

18. The hydraulic control apparatus as claimed in claim 17, wherein said hydraulic construction machine is equipped with a front attachment and capable of travelling, said first hydraulic actuator comprises a hydraulic cylinder for said front attachment, said second hydraulic actuator comprises a hydraulic motor for machine travelling, said first operating means comprises a manual manipulation member, and said second operating means comprises a pedal-type manipulation member.

19. The hydraulic control apparatus as claimed in claim 18, wherein said manual manipulation member comprises a fuel lever for setting the rotational speed of said prime mover in accordance with the manipulation position of said fuel lever, and said pedal-type manipulation member comprises a travelling pedal with which the opening area of said second control valve can be adjusted in accordance with the operation amount thereof.

20. The hydraulic control apparatus as claimed in claim 19, further including inhibition means for inhibiting the driving of said second hydraulic actuator when said discrimination signal is output.

21. The hydraulic control apparatus as claimed in claim 11, wherein, said first determination means detects a difference pressure between the pressure of a conduit for intercommunicating said first and second control valves with said hydraulic pump and the pressure of a conduit at a higher pressure side of respective conduits for intercommunicating each of said first and second control valves with said first hydraulic actuator to calculate a deviation between a predetermined target difference pressure and the detected difference pressure, and calculates said first target displacement on the basis of said deviation, and wherein.

said second determination means detects a deviation between an actual rotational speed of a diesel engine serving as said prime mover and a control rotational speed indicated by the position of a governor lever of said diesel engine, calculates on the basis of the detected deviation a target torque with which said diesel engine suffers from no engine stall, and detects said delivery pressure of said variable displacement hydraulic pump to calculate said second target displacement on the basis of the reciprocal of the detected delivery pressure and said target torque.

22. The hydraulic control apparatus as claimed in claim 21, wherein said second determination means includes means for judging a travelling operation, and wherein in the travelling operation said target torque is subjected to only a correction for increasing said target torque when said actual rotational speed is higher than said control rotational speed, and in a non-travelling operation said target torque is subjected to a correction for increasing said target torque when said actual rotational speed is higher than said control rotational speed and a correction for decreasing said target torque when said actual rotational speed is lower than said control rotational speed.

23. In a hydraulic control apparatus for a hydraulic construction machine including;

a first manual operation member which is manipulated to adjust a diesel engine so as to have an arbitrary rotational speed, a travelling pedal which is manipulated to control the travelling speed of a vehicle and is returned to its initial position when the manipulating force is released, rotational speed control means for controlling the rotational speed of said diesel engine in accordance with the operation amount of said manual operation member and said travelling pedal, a variable displacement hydraulic pump which is driven by said diesel engine, a hydraulic actuator for a front attachment which is driven by a delivery oil from said hydraulic pump, a hydraulic motor for a vehicle travelling which is driven by said delivery oil of said hydraulic pump, a control valve for said front attachment which is provided between said hydraulic pump and said hydraulic actuator for said front attachment and serves to control a pressured oil supplied to said hydraulic actuator, a control valve for a vehicle travelling which is provided between said hydraulic pump and said hydraulic motor for the vehicle travelling and serves to control a pressured oil supplied to said hydraulic motor for the vehicle travelling in accordance with the step-on amount of said travelling pedal, first determination means for determining a first target displacement to keep said delivery pressure of said hydraulic pump to a value higher than load pressure of said hydraulic actuators for said front attachment and the travelling by a predetermined target value, second determination means for determining a second target displacement to limit an input torque on the basis of said delivery pressure of said hydraulic pump, and, displacement control means for controlling said displacement of said hydraulic pump so that said displacement is equal to one of said first and second target displacements, said control apparatus further including;

judging means for outputting a discrimination signal on the basis of a discrimination of a state where said hydraulic actuator for said front attachment is operated while the rotational speed of said diesel engine is controlled by said travelling pedal, and, selecting means for selecting said second target displacement irrespective of said first target displacement when said discrimination signal is output.

24. The hydraulic control apparatus as claimed in claim 23, wherein said first determination means detects a difference pressure between the pressure of a conduit for intercommunicating said first and second control valves with said hydraulic pump and a pressure of a conduit at a higher pressure side of respective conduits for intercommunicating each of said first and second control valves with said first hydraulic actuator to calculate a deviation between a predetermined target difference pressure and the detected difference pressure, and calculates said first target displacement on the basis of said deviation, and wherein, said second determination means detects a deviation between an actual rotational speed of a diesel engine serving as said prime mover and a control rotational speed indicated by the position of a governor lever of said diesel engine, calculates on the basis of the detected deviation a target torque with which said diesel engine suffers from no engine stall, and detects said delivery pressure of said variable displacement hydraulic pump to calculate said second target displacement on the basis of the reciprocal of the detected delivery pressure and said target torque.

25. The hydraulic control apparatus as claimed in claim 24, wherein said second determination means includes means for judging the travelling operation, and wherein in the travelling operation said target torque is subjected to only a correction for increasing said target torque when said actual rotational speed is higher than said control rotational speed, and in a non-travelling operation said target torque is subjected to a correction for increasing said target torque when said actual rotational speed is higher than said control rotational speed and a correction for decreasing said target torque when said actual rotational speed is lower than said control rotational speed.

* * * * *